United States Patent
Zheng et al.

(10) Patent No.: US 12,549,065 B2
(45) Date of Patent: Feb. 10, 2026

(54) POWER TOOL WITH COMPACT OUTER-ROTOR MOTOR ASSEMBLY

(71) Applicant: Black & Decker Inc., New Britain, CT (US)

(72) Inventors: Tong Zheng, Suzhou (CN); Yuming Zhou, Yangzhou (CN); Weifeng Qian, Suzhou (CN); Pengcheng Shen, Suzhou (CN)

(73) Assignee: BLACK & DECKER INC., New Britain, CT (US)

( * ) Notice: Subject to any disclaimer, the term of this patent is extended or adjusted under 35 U.S.C. 154(b) by 327 days.

(21) Appl. No.: 18/076,684

(22) Filed: Dec. 7, 2022

(65) Prior Publication Data
US 2023/0188020 A1    Jun. 15, 2023

Related U.S. Application Data

(63) Continuation of application No. 18/075,964, filed on Dec. 6, 2022.
(Continued)

(51) Int. Cl.
*H02K 7/14* (2006.01)
*B25B 21/02* (2006.01)
(Continued)

(52) U.S. Cl.
CPC ............ *H02K 7/145* (2013.01); *B25F 5/001* (2013.01); *H02K 5/15* (2013.01); *H02K 5/1735* (2013.01);
(Continued)

(58) Field of Classification Search
CPC ........ H02K 7/145; H02K 7/116; H02K 2/791; H02K 5/15; H02K 1/30; H02K 5/12
(Continued)

(56) References Cited

U.S. PATENT DOCUMENTS 5,907,206 A    5/1999 Shiga
5,925,948 A    7/1999 Matsumoto
(Continued)

FOREIGN PATENT DOCUMENTS

DE    102008046187 A1    3/2010
EP       1670118 A1    6/2006
(Continued)

OTHER PUBLICATIONS

European Search Report mailed Jun. 30, 2023 in corresponding European application No. 22211783.0, 18 pages.
(Continued)

*Primary Examiner* — Terrance L Kenerly
*Assistant Examiner* — Theodore L Perkins
(74) *Attorney, Agent, or Firm* — Amir R. Rohani

(57) ABSTRACT

A power tool is provided including a tool housing, a transmission, and a brushless motor disposed in the tool housing that includes an inner stator, an outer rotor, and a rotor shaft. A stator mount assembly is provided including a stator mount including an axial member secured to the stator, and an integrated mounting member including a radial member secured to the stator mount, a ring gear mount extending from the radial member away from the motor, and a ring gear supported by the ring gear mount. The transmission is secured to the tool housing, and it includes a transmission housing having a generally cylindrical body, and a planetary gear set including a carrier and at least one planet gear rotatably mounted to the carrier. The ring gear meshes with the at least one planet gear. In an embodiment, the transmission housing is integrated with the stator mount assembly.

19 Claims, 33 Drawing Sheets

Related U.S. Application Data

(60) Provisional application No. 63/265,247, filed on Dec. 10, 2021.

(51) Int. Cl.
  *B25F 5/00* (2006.01)
  *H02K 5/15* (2006.01)
  *H02K 5/173* (2006.01)
  *H02K 7/08* (2006.01)
  *H02K 7/116* (2006.01)
  *H02K 9/06* (2006.01)
  *H02K 11/215* (2016.01)
  *H02K 21/22* (2006.01)

(52) U.S. Cl.
  CPC ............. *H02K 7/085* (2013.01); *H02K 7/116* (2013.01); *H02K 9/06* (2013.01); *H02K 21/22* (2013.01); *B25B 21/02* (2013.01); *H02K 11/215* (2016.01); *H02K 2211/03* (2013.01)

(58) Field of Classification Search
  USPC .......................................................... 310/83
  See application file for complete search history.

(56) References Cited

U.S. PATENT DOCUMENTS

| | | | |
|---|---|---|---|
| 6,093,984 A | 7/2000 | Shiga | |
| 2002/0158532 A1 | 10/2002 | Uemura | |
| 2007/0236099 A1 | 10/2007 | Kim et al. | |
| 2009/0026859 A1 | 1/2009 | Kinoshita et al. | |
| 2013/0328432 A1 | 12/2013 | Hoemann | |
| 2014/0091648 A1* | 4/2014 | Kumagai | H02K 7/145 310/50 |
| 2015/0340925 A1 | 11/2015 | Kang et al. | |
| 2019/0044110 A1* | 2/2019 | Sheeks | H02K 5/20 |
| 2019/0181712 A1 | 6/2019 | Aso et al. | |
| 2020/0343789 A1* | 10/2020 | Fogle | H02K 7/145 |
| 2021/0187707 A1* | 6/2021 | Smith | H02K 7/116 |

FOREIGN PATENT DOCUMENTS

| | | |
|---|---|---|
| EP | 1923978 A2 | 5/2008 |
| EP | 1897209 B1 | 8/2011 |
| EP | 2527098 A1 | 11/2012 |
| EP | 2532488 A1 | 12/2012 |
| EP | 2647472 A1 | 10/2013 |
| EP | 2908408 A1 | 8/2015 |
| EP | 3780360 A1 | 2/2021 |
| EP | 3845342 A1 | 7/2021 |
| EP | 3848161 A1 | 7/2021 |
| JP | S56110788 U | 8/1981 |
| JP | 3580878 B2 | 10/2004 |
| JP | 2006341791 A | 12/2006 |
| JP | 2020193568 A | 9/2010 |
| WO | 2007110204 A1 | 10/2007 |
| WO | 2017054709 A1 | 4/2017 |
| WO | 2018216599 A1 | 11/2018 |
| WO | 2021203909 A1 | 10/2021 |

OTHER PUBLICATIONS

EP EESR dated, May 3, 2023 in corresponding EP application No. 22211779.8.
EP EESR dated, May 9, 2023 in corresponding EP application No. 22211781.4.
EP EESR dated, May 9, 2023 in corresponding EP application No. 22211783.0.

* cited by examiner

241

249

POWER TOOL WITH COMPACT OUTER-ROTOR MOTOR ASSEMBLY

RELATED APPLICATION

This patent application is a continuation application of U.S. patent application Ser. No. 18/075,964, filed Dec. 6, 2022, which claims the benefit of U.S. Provisional Patent Application No. 63/265,247 filed Dec. 10, 2021, both of which are incorporated herein by reference in their entireties.

FIELD

This disclosure relates to a power tool, such as an impact driver or impact wrench, and a compact motor assembly for use in a power tool, such as a low-profile and compact outer-rotor brushless motor assembly.

BACKGROUND

Conventional brushless direct-current (BLDC) motors are provided with a permanent magnet rotor supported within a stator. The stator includes a ring-shaped stator core, a series of stator teeth that extend radially inwardly from the stator core, and a series of stator windings wound in various patterns on the stator teeth. The rotor includes a rotor core that supports a number of magnets and is mounted on a rotor shaft. The shaft is supported relative to the stator via one or more bearings.

Another type of BLDC motor, referred to as an outer-rotor or external rotor motor, is provided with the rotor on the outside of the stator. In an outer-rotor motor, the rotor magnets are provided on an outer cup that is rotatable around a stator core. The outer cup includes a plate on one side of the stator that is secured to a rotor shaft. US Patent Publication No. 2019/0058373, which is incorporated herein by reference in its entirety, provides an example of an outer-rotor motor in a nailer, where the outer rotor includes an integrated flywheel for driving a driver of the nailer. Outer-rotor motors provides some performance advantages over comparable inner-rotor motors. Namely, since an outer rotor is by necessity larger than an inner rotor, it creates higher inertia and reduces the torque ripple effect and lower vibration. An outer rotor also provides higher magnetic flux and is also capable of producing more torque than a comparable inner rotor motor.

Power tools such as impact drivers and impact wrenches may be used for driving threaded fasteners into workpieces. Such power tools may lack sufficient power to drive a threaded fastener into a workpiece or may be too large in length or girth to fit into a desired location. In such power tools, it is desirable to reduce the girth and/or length of the tool, including the motor assembly and related components, without sacrifice power performance.

SUMMARY

According to an embodiment of the invention, a power tool is provided including a tool housing, a brushless direct-current (BLDC) motor disposed in the tool housing, and a transmission. The motor includes a stator including a stator core having an aperture extending therethrough and stator windings, a rotor including a cylindrical rotor core supporting at least one permanent magnet around an outer surface of the stator core, a rotor shaft rotatably coupled to the rotor, and a stator mount including a radial member disposed proximate a front end of the stator and an axial member secured to the stator. The transmission is secured to the tool housing and includes an input member coupled to and configured to be rotatably driven by rotation of the rotor shaft, and an output member configured to be driven by rotation of the input member. The radial member of the stator mount is secured to the transmission to support the stator at least radially within the rotor.

In an embodiment, the rotor includes a rear wall proximate a rear end of the stator that is mounted on the rotor shaft, and the rotor shaft extends through the aperture of the stator to be coupled to the input member of the transmission.

In an embodiment, the axial member of the stator mount comprises a cylindrical portion onto which the stator core is securely mounted, and the rotor shaft extends through the cylindrical portion.

In an embodiment, the motor further includes at least one motor bearing having an inner race mounted on the rotor shaft and an outer race secured within the cylindrical portion. In an embodiment, the motor bearing is radially aligned with the stator core. In an embodiment, the motor bearing is radially oriented along a radial plane located between the stator core and the radial member of the stator mount.

In an embodiment, the transmission includes a transmission housing having a generally cylindrical body, and a planetary gear set including a pinion or a sun gear rotatably driven by the rotor shaft, a carrier, at least one planet gear rotatably mounted to the carrier and meshed with the pinion or the sun gear, and a ring gear supported by the transmission housing and meshed with the at least one planet gear.

In an embodiment, the transmission comprises a rear wall located at a rear end of the transmission housing, and the radial member of the stator mount is at least radially secured to the rear wall.

In an embodiment, the rear wall of the transmission includes a recessed surface formed by an annular peripheral body sized to form-fittingly receive the radial member of the stator mount therein.

In an embodiment, the radial member of the stator mount is rotationally secured to the rear wall of the transmission via at least one notch and indentation arrangement.

In an embodiment, the tool housing includes a radial wall projecting radially between the motor and the transmission assembly and engaging a rear surface of the radial member of the stator mount to axially hold the radial member in engagement with the rear wall of the transmission assembly.

In an embodiment, a carrier bearing is provided to support the carrier relative to the rear wall of the transmission.

In an embodiment, the rear wall of the transmission includes an annular center body forming a bearing holder for the carrier bearing, and the radial member of the stator mount includes an intermediary cylindrical portion forming a center recessed portion that receives the annular center body.

In an embodiment, a radial plane of the radial member of the stator mount intersects a portion of the carrier bearing.

In an embodiment, the rear wall of the transmission includes an annular body projecting towards the motor, and the tool includes a lock ring configured to axially hold the radial member of the stator mount in engagement with a rear surface of the annular body. In an embodiment, the lock ring includes a main portion having a threaded inner surface that is fastened onto a threaded outer surface of the annular body of the transmission, and a radial portion that engages and forces a rear surface of the radial member of the stator mount against the annular body of the transmission.

In an embodiment, the radial member of the stator mount includes tabs extending therefrom that engage the transmission housing to secure the stator mount at least radially to the transmission. In an embodiment, a rear end of the transmission housing defines an opening through which the ring gear is received.

In an embodiment, an interior of the transmission housing includes recessed surfaces near the rear end, and the tabs of the radial member extend axially through the opening in engagement with the recessed surfaces to affix the stator mount at least radially to the rear end of the transmission.

In an embodiment, the rear end of the transmission housing includes notches, and the tabs of the radial member extend radially in engagement with the notches to affix the stator mount at least rotationally to the rear end of the transmission.

In an embodiment, the radial member of the stator mount and the transmission housing mated together cooperate to substantially seal the transmission.

In an embodiment, the transmission includes of outer protrusions on the outer surface of the transmission housing configured to engage a portion of the tool housing to rotationally fix the transmission.

In an embodiment, the tool housing includes a radial wall projecting radially between the motor and the transmission assembly and engaging a rear surface of the radial member of the stator mount to axially hold the radial member to the transmission housing.

In an embodiment, a distance between a front end of the motor and a rear end of the transmission is at smaller than or equal to 11.3 mm. In an embodiment, the motor has an outer diameter than is smaller than or equal to approximately 52 mm and produces a maximum power output of at least 620 watts from a 20V max power tool battery pack.

According to another aspect of the invention, a power tool is provided including a tool housing, a brushless direct-current (BLDC) motor disposed in the tool housing, a stator mount assembly, and a transmission. The motor includes a stator including a stator core having an aperture extending therethrough and stator windings, a rotor including a cylindrical rotor core supporting at least one permanent magnet around an outer surface of the stator core, and a rotor shaft rotatably coupled to the rotor. The stator mount assembly includes a stator mount including an axial member secured to the stator, and an integrated mounting member including a radial member secured to the stator mount, a ring gear mount extending from the radial member away from the motor, and a ring gear supported by the ring gear mount. The transmission is secured to the tool housing, and it includes a transmission housing having a generally cylindrical body, and a planetary gear set including a carrier and at least one planet gear rotatably mounted to the carrier. The ring gear meshes with the at least one planet gear.

In an embodiment, the rotor includes a rear wall proximate a rear end of the stator that is mounted on the rotor shaft, and the rotor shaft extends through the aperture of the stator to be coupled to the input member of the transmission.

In an embodiment, the axial member of the stator mount includes a cylindrical portion onto which the stator core is securely mounted, and the rotor shaft extends through the cylindrical portion.

In an embodiment, at least one motor bearing is provided including an inner race mounted on the rotor shaft and an outer race secured within the cylindrical portion.

In an embodiment, the motor bearing is radially aligned with the stator core.

In an embodiment, the stator mount includes at least one radial arm, and the radial member of the integrated mounting member is molded around the radial arm to secure the integrated mounting member to the stator mount.

In an embodiment, the stator mount includes at least one protrusion that is received into a peripheral opening of the integrated mounting member to secure the integrated mounting member at least rotationally to the stator mount.

In an embodiment, a carrier bearing is provided to support the carrier relative to the stator mount assembly.

In an embodiment, the stator mount includes a frontal annular body forming a bearing holder for the carrier bearing to radially align the carrier bearing with the radial member of the integrated mounting member.

In an embodiment, the ring gear mount is discretely coupled to the transmission housing.

In an embodiment, the transmission housing overlaps at least the ring gear mount of the integrated mounting member.

In an embodiment, an O-ring is disposed between the integrated mounting member and the transmission housing to substantially seal the transmission.

In an embodiment, the power tool includes a nosecone mounted on the tool housing to provide an output member configured to be rotatably driven by a cam shaft coupled to the carrier, wherein the transmission housing is integrally formed with the nosecone and extends rearwardly therefrom inside the tool housing.

In an embodiment, the transmission housing is integrally coupled to the ring gear mount.

In an embodiment, a distance between a front end of the motor and a rear end of the transmission is at smaller than or equal to 7.7 mm. In an embodiment, the motor has an outer diameter than is smaller than or equal to approximately 52 mm and produces a maximum power output of at least 620 watts from a 20V max power tool battery pack.

According to another aspect of the invention, a power tool is provided including a tool housing, a brushless direct-current (BLDC) motor disposed in the tool housing, and a stator mount assembly. The motor includes a stator including a stator core having an aperture extending therethrough and stator windings, a rotor including a cylindrical rotor core supporting at least one permanent magnet around an outer surface of the stator core, and a rotor shaft rotatably coupled to the rotor. The stator mount assembly includes a stator mount including an axial member secured to the stator, and an integrated mounting member including a radial member secured to the stator mount and a transmission housing having a generally cylindrical body integrally extending from the radial member away from the motor. The transmission housing is secured to the tool housing and houses components of a transmission, and the components of the transmission include a carrier, at least one planet gear rotatably mounted to the carrier, and a ring gear supported by the transmission housing and meshed with the planet gear(s).

In an embodiment, the rotor comprises a rear wall proximate a rear end of the stator that is mounted on the rotor shaft, and the rotor shaft extends through the aperture of the stator to be coupled to the input member of the transmission.

In an embodiment, the axial member of the stator mount includes a cylindrical portion onto which the stator core is securely mounted, and the rotor shaft extends through the cylindrical portion.

In an embodiment, at least one motor bearing is provided including an inner race mounted on the rotor shaft and an outer race secured within the cylindrical portion. In an embodiment, motor bearing is radially aligned with the stator core.

In an embodiment, the stator mount includes at least one radial arm, and wherein the radial member of the integrated mounting member is molded around the radial arm to secure the integrated mounting member to the stator mount.

In an embodiment, the stator mount includes at least one protrusion that is received into a peripheral opening of the integrated mounting member to secure the integrated mounting member at least rotationally to the stator mount.

In an embodiment, a carrier bearing is provided to support the carrier relative to the stator mount assembly.

In an embodiment, the stator mount includes a frontal annular body forming a bearing holder for the carrier bearing to radially align the carrier bearing with the radial member of the integrated mounting member.

In an embodiment, the power tool further includes a nosecone mounted on the tool housing to provide an output member, where a front portion of the transmission housing extends out of the tool housing and is received within the nosecone.

In an embodiment, an O-ring is disposed between the front portion of the transmission housing and the nosecone to substantially seal the transmission assembly.

In an embodiment, a nosecone mounted on the tool housing to provide an output member configured to be rotatably driven by a cam shaft coupled to the carrier, where the transmission housing is integrally formed with the nosecone and extends rearwardly therefrom inside the tool housing.

In an embodiment, the transmission housing includes at least one inner rim that engages an axial end of the ring gear to secure the ring gear within the transmission housing.

In an embodiment, the transmission includes outer protrusions on the outer surface of the transmission housing configured to engage a portion of the tool housing to rotationally fix the transmission.

In an embodiment, a distance between a front end of the motor and a rear end of the transmission is at most 7.7 mm. In an embodiment, the motor has an outer diameter than is smaller than or equal to approximately 52 mm and produces a maximum power output of at least 620 watts from a 20V max power tool battery pack.

According to another aspect of the invention, a brushless direct-current (BLDC) motor is provided including: a stator including a stator core having an aperture extending therethrough and a series of stator windings; and a rotor including a rotor core having a substantially cylindrical body, permanent magnets secured to an inner surface of the rotor core, a rotor shaft extending through the stator, and an overmold structure. The overmold structure includes: a radially body extending adjacent an axial end of the stator and coupled to the rotor shaft via a bushing, and a peripheral body formed around an outer surface and axial end surfaces of the rotor core and structurally securing the permanent magnets to the inner surface of the rotor core.

In an embodiment, the rotor core includes teeth axially projecting from at least one of its axial end surfaces, and the overmold structure is formed in engagement with the teeth to rotationally fix the rotor core relative thereto.

In an embodiment, the radial body of the overmold structure includes blades that form a fan for generating an airflow through the motor.

In an embodiment, the rotor core includes a continuous wire rod wound in a shape of a tubular body.

In an embodiment, the wire rod is welded in the shape of the tubular body.

In an embodiment, the wire rod is held in the shape of the tubular body via the overmold structure.

According to another aspect of the invention, a brushless direct-current (BLDC) motor is provided including: a stator including a stator core having an aperture extending therethrough and a series of stator windings; and a rotor including permanent magnets, a rotor shaft extending through the stator, and an overmold structure. The overmold structure includes: a radially body extending adjacent an axial end of the stator and coupled to the rotor shaft via a bushing, and a substantially cylindrical body formed to secure the plurality of permanent magnets. At least the substantially cylindrical body of the overmold structure is formed via a metal injection molding process to increase a magnetic flux of the rotor.

In an embodiment, the motor includes no solid core flux ring.

In an embodiment, the radial body of the overmold structure includes blades that form a fan configured to generate an airflow through the motor.

According to another aspect of the invention, a brushless direct-current (BLDC) motor is provided including: a rotor comprising a rotor core, permanent magnets secured to the rotor core, and a rotor shaft; a stator including a stator core having an inner annular body though which the rotor shaft extends and stator teeth extending radially outwardly from the inner annular body, stator windings wound around the stator teeth, an insulating body electrically insulating the stator windings from the stator core, and stator terminals mounted to the insulating body and electrically coupled to the stator windings; and a positional sensor board mounted to the insulating body and including at least one positional sensor configured to magnetically sense the permanent magnets. The positional sensor board is C-shaped including two ends defining a gap in between, and the stator terminals are located within the gap so as to radially intersect a radial plane of the positional sensor board.

In an embodiment, the positional sensor board includes an outer diameter than is greater than an outer diameter of the stator.

In an embodiment, the positional sensor board includes an inner diameter than is greater than an inner diameter of the inner annular body.

In an embodiment, the insulating body includes axial posts that support the positional sensor board.

In an embodiment, the stator terminals are aligned with three of the stator teeth.

In an embodiment, the gap occupies an angular distance of approximately 40 to 50 degrees.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

The drawings described herein are for illustration purposes only and are not intended to limit the scope of this disclosure in any way.

Throughout this specification and figures like reference numbers identify like elements.

DESCRIPTION

Example embodiments will now be described more fully with reference to the accompanying drawings. It is to be understood that both the foregoing general description and the following detailed description are exemplary and explanatory only and are intended to provide an explanation of various embodiments of the present teachings.

Figure 1:
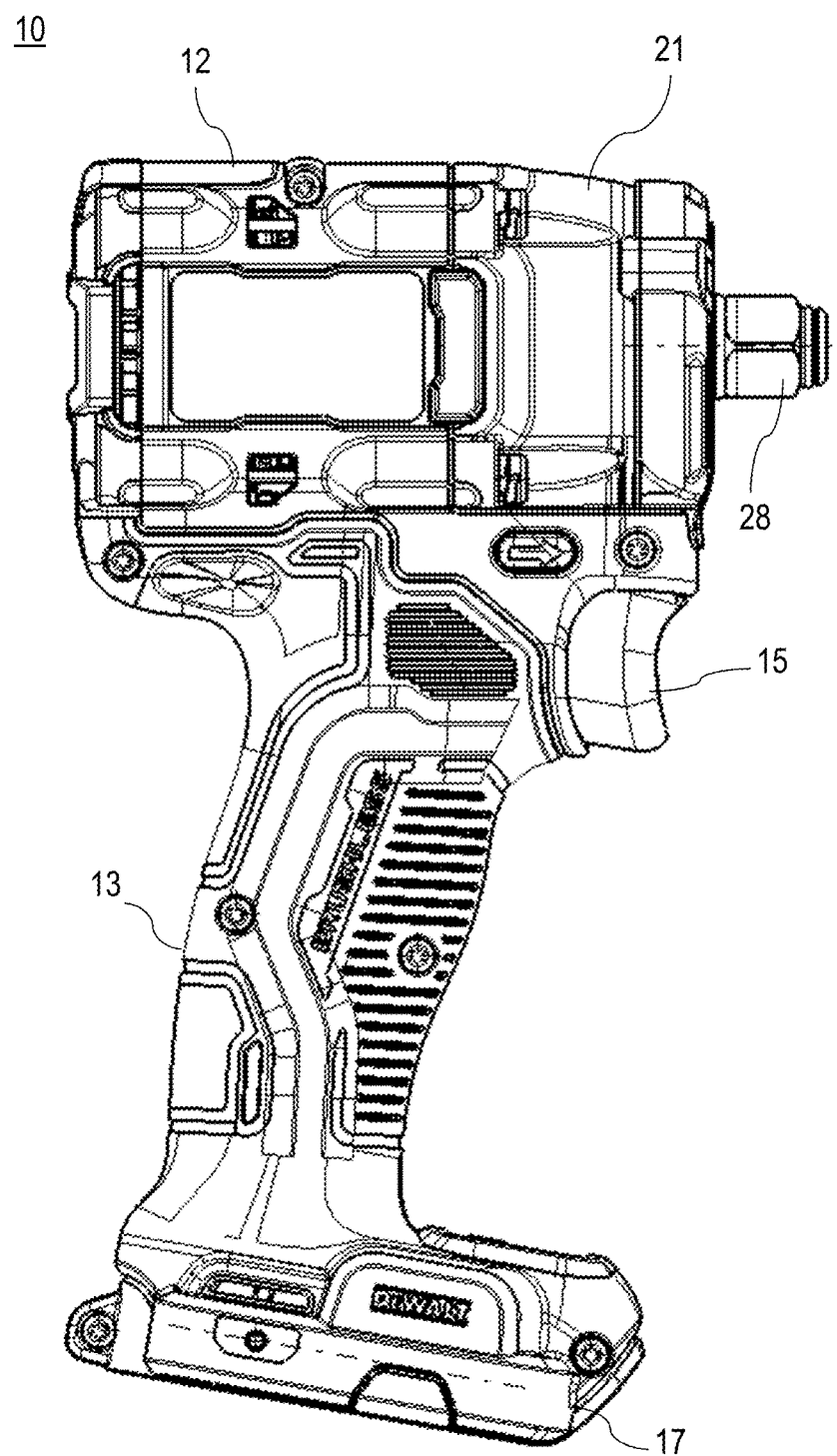
FIG. 1 depicts a side view of a power tool, in this example an impact tool, according to an embodiment.
Figure 2:
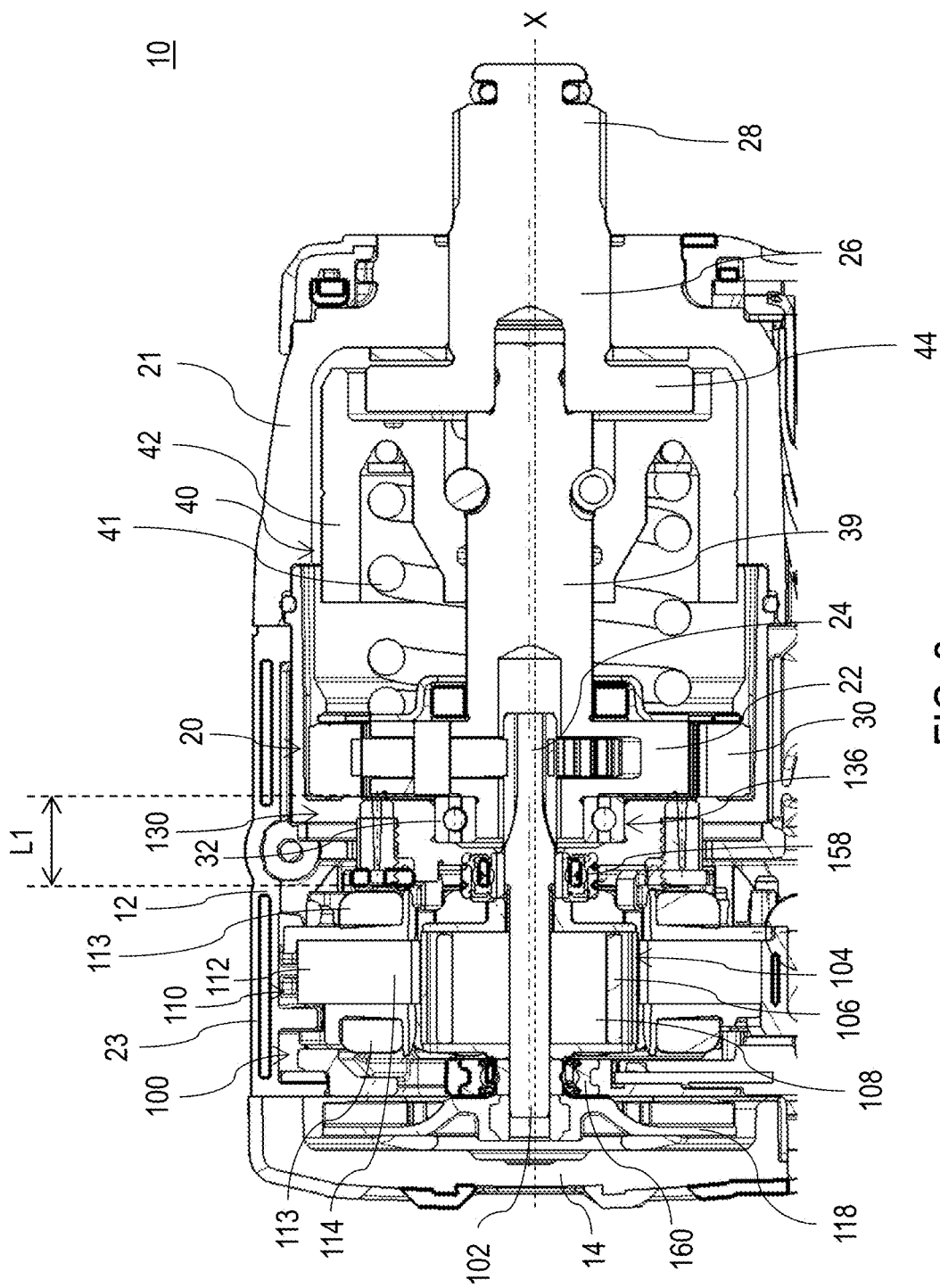
FIG. 2 depicts a partial cross-sectional view of the exemplary impact tool, according to an embodiment.
Figure 3:
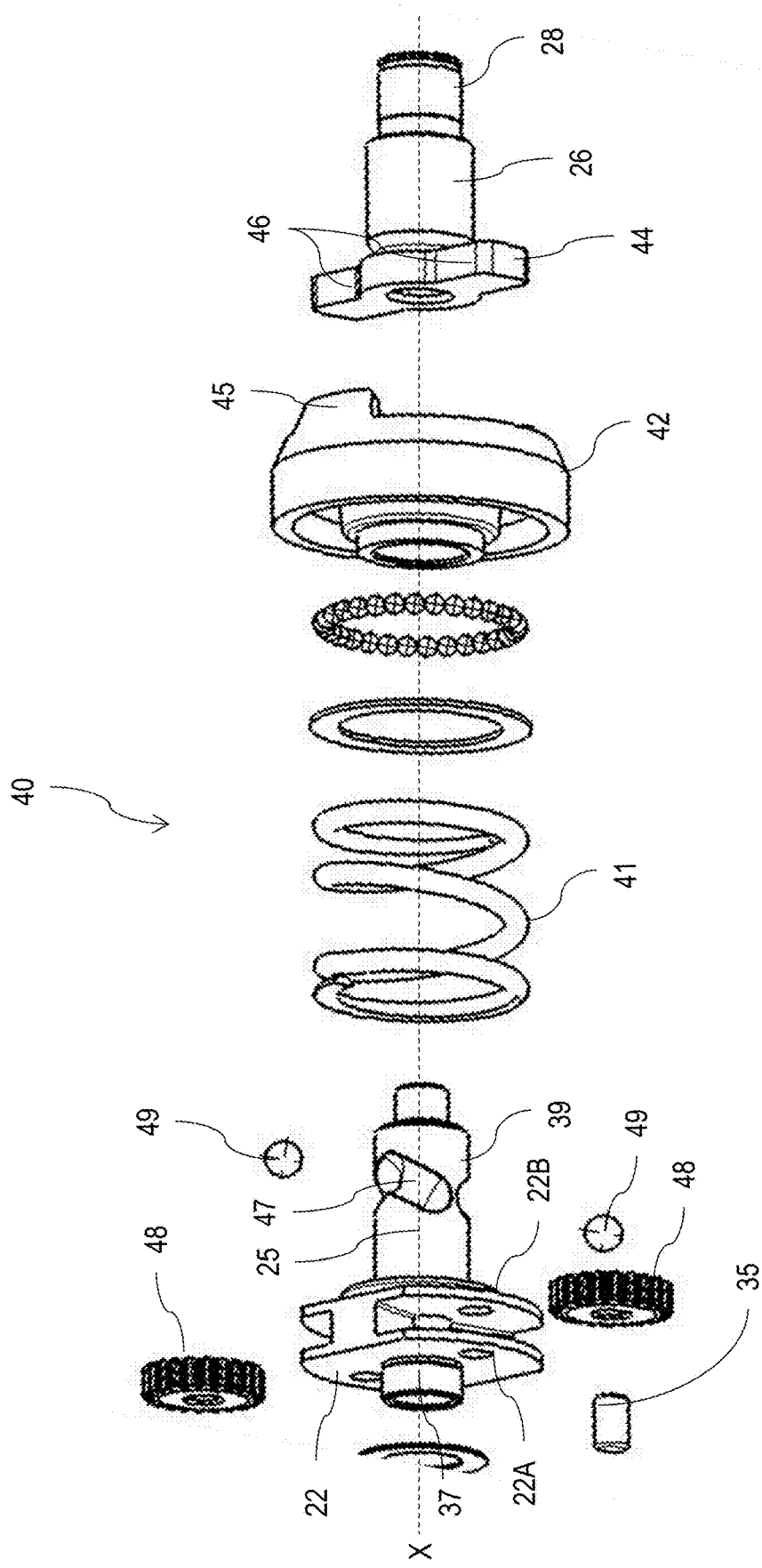
FIG. 3 depicts an exploded view of an impact mechanism of the exemplary impact tool, according to an embodiment.

FIG. 1 depicts a side view of a power tool 10, in this example an impact tool, according to an embodiment. FIG. 2 depicts a partial cross-sectional view of the exemplary impact tool 10 according to an embodiment. FIG. 3 depicts an exploded view of an impact mechanism of the exemplary impact tool 10 according to an embodiment.

In an embodiment, the exemplary impact tool 10 includes a housing 12 having a motor housing portion 23 including two clamshells that come together to house a motor 100 rotatably driving a rotor shaft 102 and a nosecone 21 coupled to the motor housing portion 23 that houses an impact mechanism 40. A transmission assembly 20 is disposed between the motor 100 and the impact mechanism 40 that cooperates with the impact mechanism 40 to selectively impart rotary motion and/or a rotary impact motion to an output spindle 26. Where the tool is an impact wrench, as shown in this example, a socket drive 28 is formed at the end of the output spindle 26 designed to drive a socket wrench (not shown). Alternatively, where the power tool is an impact driver, a bit holder may be coupled to the end of the output spindle. Details regarding exemplary tool holders are set forth in U.S. patent application Ser. No. 12/394,426, which is incorporated herein by reference.

The power tool further includes a handle 13 that extends transverse to the housing 12 and accommodates a trigger switch 15, a control and/or power module (not shown) that includes control electronics and switching components for driving the motor 100, and a battery receptacle 17 that receives a removeable power tool battery pack for supplying electric power to the motor 100. The handle 13 has a proximal portion coupled to the housing 12 and a distal portion coupled to the battery receptacle 17. The motor 100 may be powered by an electrical power source, such as a DC power source or battery (not shown), that is coupled to the battery receptacle 17, or by an AC power source. The trigger 15 is coupled to the handle 13 adjacent the housing 12. The trigger 15 connects the electrical power source to the motor 100 via the control and/or power module, which controls power delivery to the motor 100.

In an embodiment, the transmission assembly 20 may comprise a planetary transmission and may include, among other features, a pinion or sun gear 24 that is coupled to an end of the rotor shaft 102 of the motor 100 and that extends along a tool axis X. One or more planet gears 48 surround and have teeth that mesh with the teeth on the sun gear 24. An outer ring gear 30 is rotationally fixed to the housing 12 and centered on the tool axis X with internal teeth meshing with the teeth on the planet gears 48. A cam carrier 22 includes a pair of carrier plates 22A, 22B that support the planet gears 48 with pins 35 so that the planet gears 48 can rotate about the pins 55. The cam carrier 22 further includes a rearward protrusion 37 that extends axially rearward from the rear carrier plate 22A along the axis X and a cam shaft 39 that extends axially forward from the front carrier plate 22B along the axis X.

When the motor 100 is energized, the rotor shaft 102 and the sun gear 24 rotate about the axis X. Rotation of the sun gear 24 causes the planet gears 48 to orbit the sun gear 24 about the axis X, which in turn causes the cam carrier 22 to rotate about the axis X at a reduced speed relative to the rotational speed of the rotor shaft 102. In the illustrated embodiment, only a single planetary stage is shown. It should be understood that the transmission may include multiple planetary stages that may provide for multiple speed reductions, and that each stage can be selectively actuated to provide for multiple different output speeds of the planet carrier. Further, the transmission may include a different type of gear system such as a parallel axis transmission or a spur gear transmission.

The impact mechanism 40 includes the cam shaft 59, a generally cylindrical hammer 42 received over the cam shaft 59, and an anvil 44 fixedly coupled to the output spindle 26. The hammer 42 has two lugs 45 configured to engage two radial projections 46 on the anvil 44 in a rotating direction. Formed on an outer surface of the cam shaft 59 is a pair of rear-facing V-shaped cam grooves 47 with their open ends facing toward transmission assembly 20. A corresponding pair of forward-facing V-shaped cam grooves (not shown) is formed on an interior surface of the hammer 42 with their open ends facing toward the output spindle 26. Balls 49 are received in and rides along each of the cam grooves 47 to movably couple the hammer 42 to the cam shaft 59. A compression spring 41 is received in a cylindrical recess in the hammer 42 and abuts a forward face of the front carrier plate 22B. The spring 41 biases the hammer 42 toward the anvil 44 so that the so hammer lugs 45 engage the corresponding anvil projections 44.

At low torque levels, the impact mechanism 40 transmits torque from the transmission assembly 20 to the output spindle 26 in a rotary mode. In the rotary mode, the compression spring 41 maintains the hammer 42 in a forward position so that the hammer lugs 45 continuously engage the anvil projections 46. This causes the cam shaft 59, the hammer 42, the anvil 44, and the output spindle 26 to rotate together as a unit about the axis X. As torque increases, the impact mechanism 40 may transition to transmitting torque to the output spindle 26 in an impact mode. In the impact mode, the hammer 44 moves axially rearwardly against the force of the spring 41, decoupling the hammer lugs 45 from the anvil projections 46. The anvil 44 continues to spin freely on about the axis X without being driven by the motor 100 and the transmission assembly 20, so that the anvil 44 coasts to a slower speed. Meanwhile, the hammer 42 continues to be driven at a higher speed by the motor 100 and transmission assembly 20, while the hammer 42 moves axially rearwardly relative to the anvil 44 by the movement of the balls 49 in the V-shaped cam grooves 47. When the balls 49 reach their rearmost position in the V-shaped cam grooves 47, the spring 41 drives the hammer 42 axially forward with a rotational speed that exceeds the rotational speed of the anvil 44. This causes the hammer lugs 45 to rotationally strike the anvil projections 46, imparting a rotational impact to the output spindle 26.

In an embodiment, the motor 100 is a brushless direct-current (BLDC) motor that includes an inner rotor 104 having surface-mount magnets 106 on a rotor core 108 and a stator assembly 110 located around the rotor 104. The stator assembly 110 includes a stator core 112 having a series of teeth 114 projecting radially inwardly from the stator core 112, and a series of conductive windings 113 wound around the stator teeth 114 to define three phases connected in a wye or a delta configuration. As the phases of the stator assembly 110 are sequentially energized, they interact with the rotor magnets 106 to cause rotation of the rotor 104 relative to the stator assembly 110.

In an embodiment, the rotor core 108 is mounted on the rotor shaft 102 and supports a series of rotor magnet 106. The rotor core 108 may be made of a solid core piece of metal or lamination stack that includes a series of parallel laminations. In an embodiment, the rotor magnet 106 is a ring surface-mounted on the outer surface of the rotor core 108 and magnetized in a series of poles, e.g., four poles having a S-N-S-N orientation. Alternatively, rotor magnet 106 may be provided as a series of discrete magnet segments that may be pre-magnetized prior to assembly. The outer surface of the rotor core 108 may be shaped for proper retention of the magnet segments. In yet another embodiment, the rotor magnets 106 may be fully or partially embedded within the rotor core 108.

In an embodiment, a fan 118 is mounted on the rotor shaft 102 behind the motor 100. In an embodiment, a rear tool cap 14 is mounted to the end of the housing 12 to contain the end of the motor 100. The rear tool cap 14 may be provided integrally with the housing 12 or as a separate piece. In an embodiment, the fan 118 is positioned between the motor 100 and the rear tool cap 14. The fan 118 generates airflow through the motor 100 and (preferably) the transmission assembly 20 to cool the components.

In an embodiment, a rear motor bearing 160 that supports the rotor shaft 102 is supported by a wall or retention rib of the tool housing 12. In an embodiment, a support plate 130 supports a front motor bearing 158 that in turn supports the rotor shaft 102. The support plate 130 includes a cylindrical portion 132 that receives the outer race of the front motor bearing 158 and a radial portion 134 that extends radially from the cylindrical portion 132 and includes radial ends supported by the tool housing 12. The stator assembly 110 is also supported by the tool housing 12, thus being axially and radially secure with respect to the support plate 130. In this manner, the support plate 130 axially and radially supports the rotor 104 within the stator assembly 110. In an embodiment, the support plate 130 and the stator assembly 110 may be independently supported by the tool housing 12. In another embodiment, the support plate may be formed integrally as a part of two clamshells that form the tool housing 12. Alternatively, the support plate 130 may be piloted to and retained by the stator assembly 110 directly and independently of the tool housing 12.

In an embodiment, the support plate 130 also has a front lip that supports a component of the transmission assembly 20, such as supporting the ring gear 30, to inhibit axially and rotational movement of the ring gear 30 relative to the housing 12. In addition, the support plate 130 supports a cam carrier bearing 32 that supports the cam carrier 22 relative to the support plate 130, and therefore relative to the motor 100 and the tool housing 12. The cam carrier bearing 32 is nested within the support plate 130 adjacent the motor 100. Specifically, the support plate 130 is positioned between the motor 100 and transmission assembly 20 and provides support for the front motor bearing 158 on one side and for the cam carrier bearing 32 on the other side. In an embodiment, the support plate 130 includes a recessed portion 136 that includes a larger diameter than the cylindrical portion 134 and is sized to receive the cam carrier bearing 32 therein. The cam carrier bearing 32 is thus located axially forward of the entire motor 100.

In an embodiment, motor 100 has a total length from the rearmost part of the motor (e.g., the fan 118) to the frontmost part of the motor (e.g., front of the windings 113) of approximately 45 mm to 50 mm and a diameter defined by the outer surface of the stator core 112 of approximately 44 mm to 57 mm (e.g., approximately 51 mm). In an embodiment, a distance L1 between a front of the motor, in this example defined by the forwardmost part of the windings 113, to the rear of the cam carrier 22, is approximately 10.4 mm. Thus, the power tool 10 has a total length of approximately 120 to 130 mm. In an embodiment, the motor 100 produces a maximum power output of at least 426 watts.

According to an alternative embodiment, various examples of an outer-rotor BLDC motor is provided as a substitute for the above-described inner-rotor BLDC motor 100, as described herein with reference to FIGS. 4-25. The outer-rotor motor may be configured to include many of the size and power limitations described above with reference to FIGS. 1-4, but it includes an exterior rotor that surrounds an interior stator. Outer-rotor motors typically have a higher inertia than comparable inner-rotor motors due to the greater size of the rotor assembly, which dampen torque ripple and provide a more stable operation even at low speed. Further, outer-rotor motors, due to the larger area of magnetic flux, are typically capable of providing higher torque than comparably sized inner-rotor motors. In an embodiment, the outer-rotor motors described herein produce more power than the inner-rotor motor described above, without adding to the overall size or length of the tool. In fact, embodiments of the outer-rotor motor described herein reduce the overall length of the motor and the power tool.

Figure 4:
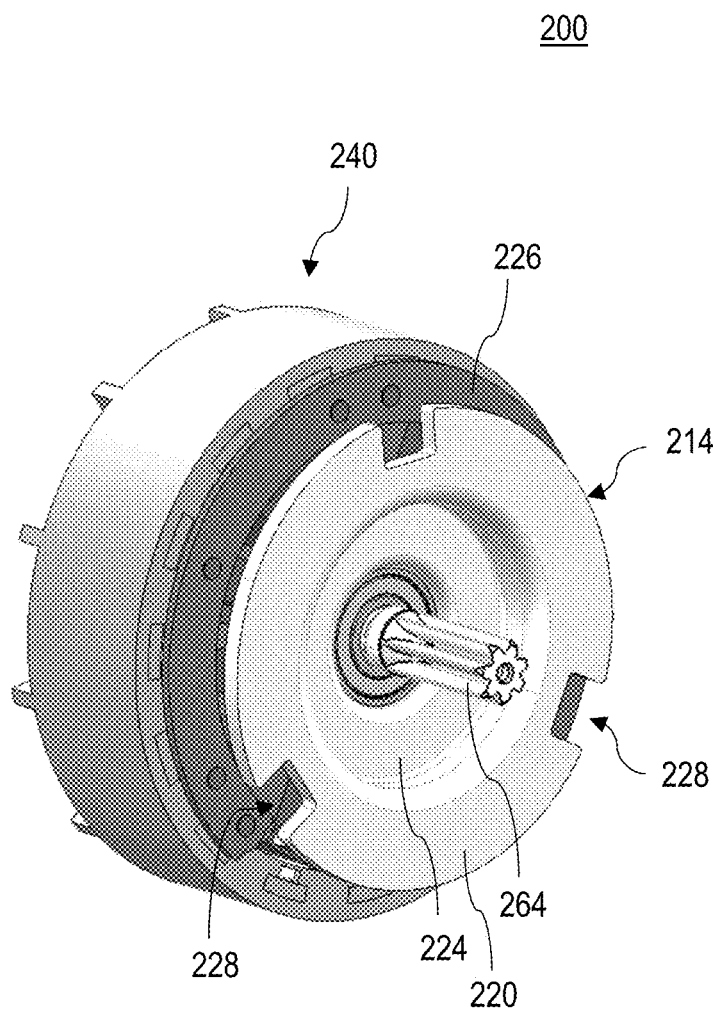
FIG. 4 depicts a perspective view of an outer-rotor BLDC motor, according to a first embodiment.
Figure 5:
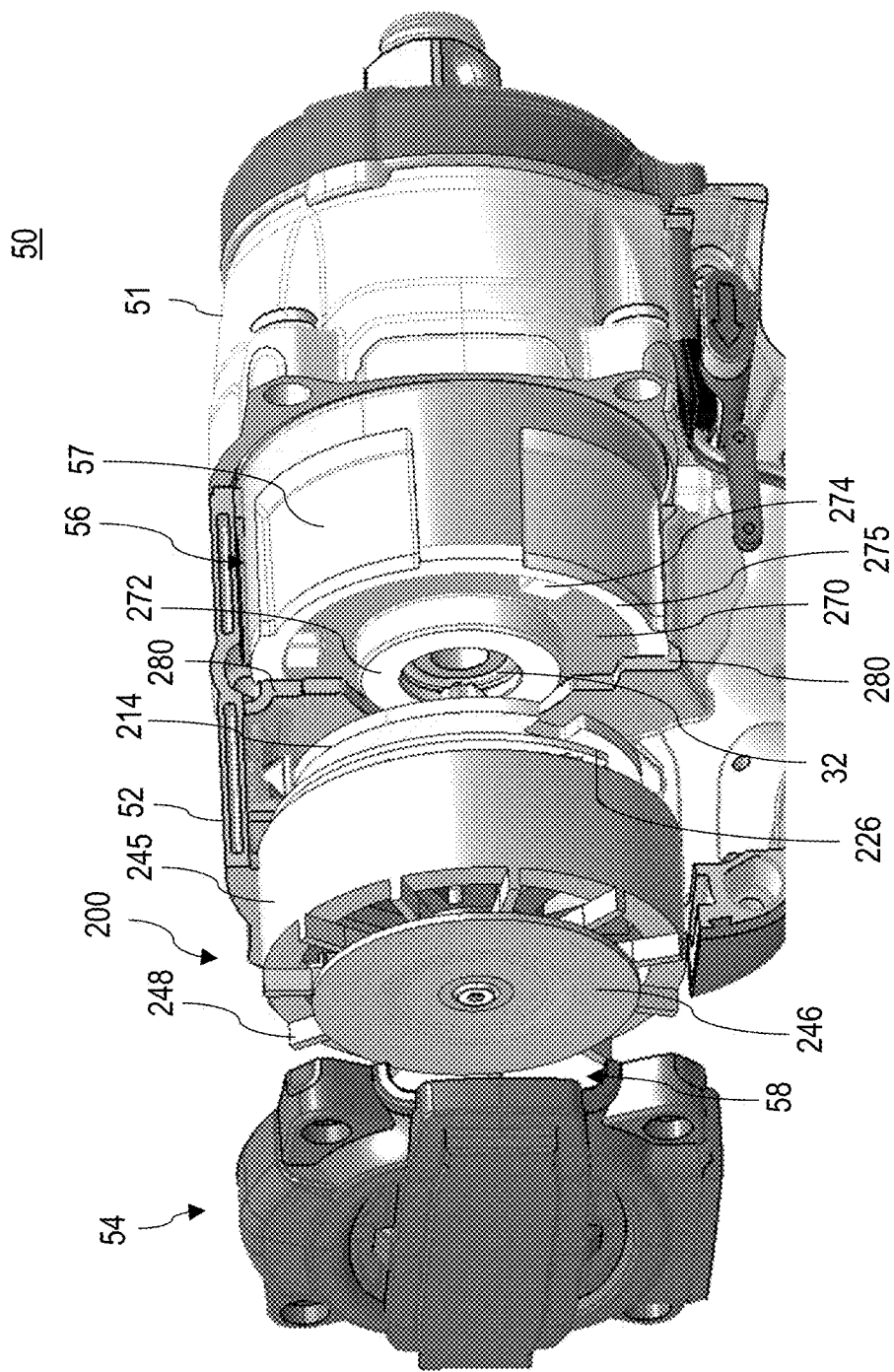
FIG. 5 depicts a partial exploded view of the power tool including the outer-rotor BLDC motor and a transmission assembly, according to an embodiment.
Figure 6:
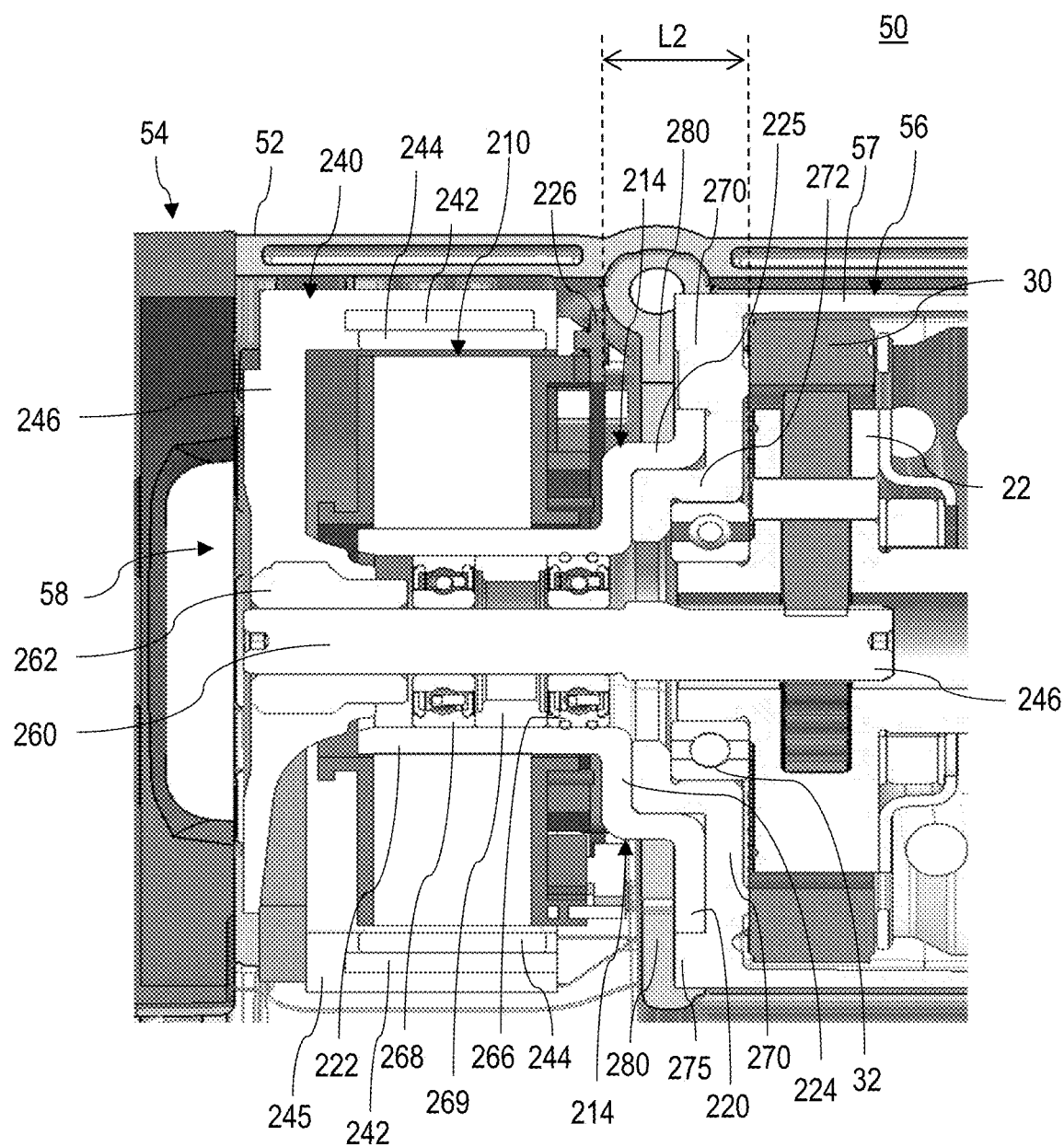
FIG. 6 depicts a partially cross-sectional view of the power tool including the outer-rotor BLDC motor, according to an embodiment.
Figure 7:
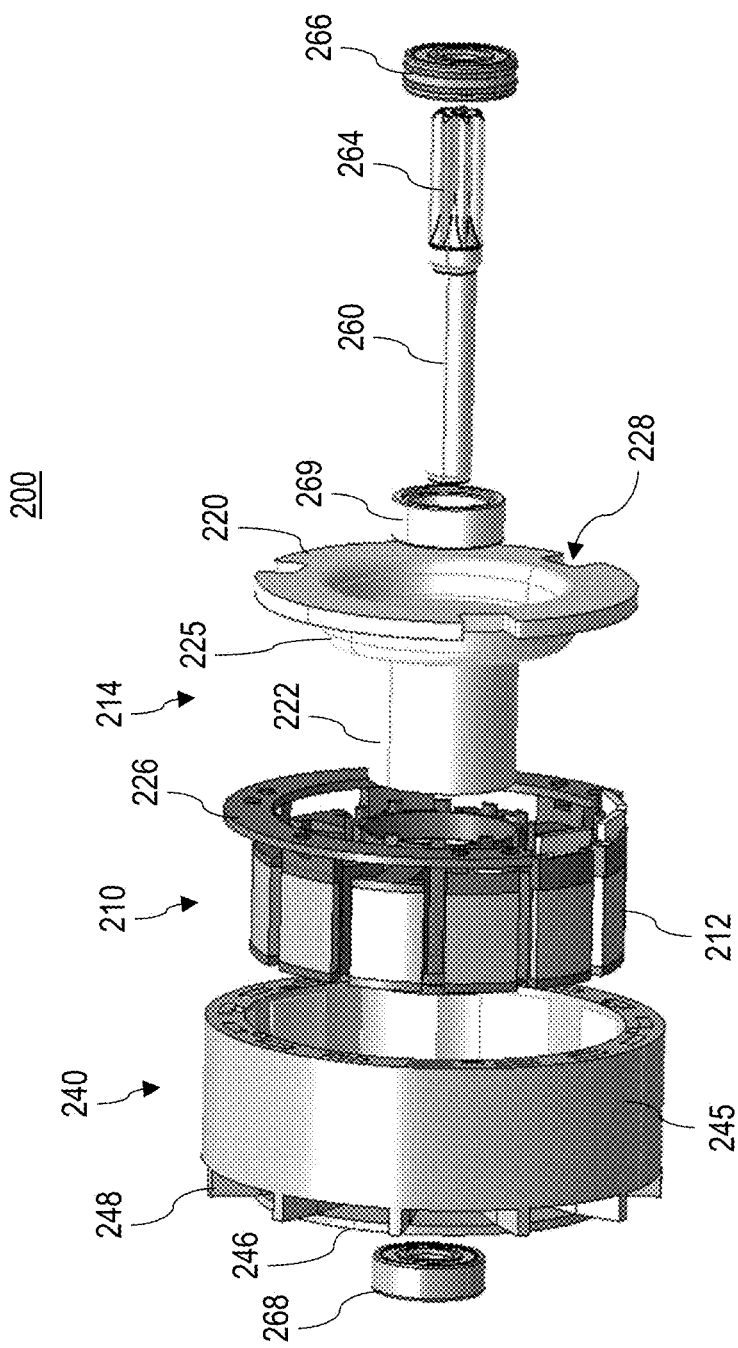
FIG. 7 depicts an exploded view of the outer-rotor BLDC motor, according to an embodiment.

FIG. 4 depicts a perspective view of an outer-rotor BLDC motor 200, according to a first embodiment of the invention. FIG. 5 depicts a partial exploded view of the power tool 50 including the outer-rotor BLDC motor 200 and a transmission assembly 56, according to an embodiment. FIG. 6 depicts a partially cross-sectional view of the power tool 50 including the outer-rotor BLDC motor 200, according to an embodiment. FIG. 7 depicts an exploded view of the outer-rotor BLDC motor 200, according to an embodiment.

In an embodiment, power tool 50 includes many of the same features as power tool 10 described above, including but not limited to, a power tool housing 52 including two clamshells that come together to house the motor 200, and a nosecone 51 that houses an impact mechanism (not shown). The transmission assembly 56 is disposed between the motor 200 and the impact mechanism and cooperates with the impact mechanism to selectively impart rotary motion and/or a rotary impact motion to an output spindle.

In an embodiment, tool housing 52 and transmission assembly 56 respectively include many of the same features of tool housing and transmission assembly previously discussed, with some differences discussed below in detail. To the extent that these or other power tool components include identical or similar features as described above, the same reference numerals are used.

In an embodiment, as shown in these figures, the outer rotor-rotor BLDC motor 200 includes an internal stator assembly 210 received within an external rotor assembly 240.

In an embodiment, stator assembly 210 includes a stator core (also referred to as stator lamination stack) 212 formed by a series of steel laminations. The stator lamination stack 212 is mounted on and structurally supported via a stator mount 214, described below. The stator lamination stack 212 supports a series of stator windings (not shown). In an exemplary embodiment, the stator windings are wound in three phases, which, when respectively energized by a control module, cause rotation of the rotor assembly 240. For a discussion of structural details of the stator assembly 210, reference is made to US Patent Publication No. 2020/0343789 filed Apr. 23, 2020, which is incorporated herein by reference in its entirety.

In an embodiment, the stator mount 214 includes an elongated cylindrical portion 222 sized to be received securely within a central aperture of the stator lamination stack 212. In an embodiment, the stator lamination stack 212 may be press-fitted over the cylindrical portion 222 of the stator mount 214. In an embodiment, stator mount 214 further includes a radial member 220 at an end of the cylindrical portion 222 outside the body of the stator lamination stack 212. The radial member 220 of the stator mount, as described below in detail, engages the transmission assembly 56 and (in an embodiment) a portion of the tool housing 52 to structurally pilot and support the stator assembly 210.

In an embodiment, a positional sensor board 226 is mounted on an end of the stator lamination stack 212, between the stator lamination stack 212 and the radial member 220 of the stator mount 214. In an embodiment, the positional sensor board 226 includes a series of Hall sensors positioned for sensing a rotary position of the rotor assembly 240. Signals indicative of the rotary position of the rotor assembly 240 are provided by the Hall sensors to the control module.

In an embodiment, rotor assembly 240 includes a cylindrical rotor core 242 formed around the stator assembly 210, and a series of permanent magnets 244 secured to the inner surface of the rotor core 242 facing the stator assembly 210 with a small airgap therebetween. As will be described later, the magnets 244 are held relative to the rotor core 242 via an overmold structure 245. As the stator windings are energized in a controlled pattern, they magnetically interact with permanent magnets 244, thus causing the rotation of the rotor assembly 240.

In an embodiment, the rotor assembly 240 further includes a radial body 246 peripherally connected (either integrally or discretely) to a rear end of the rotor core 242. In an embodiment, the radial body 246 includes a series of openings adjacent the rotor core 242, which form a series of blades 248 extending radially therebetween. The blades 248 form a fan adjacent the rotor core 242 that generates an airflow with the rotation of the rotor assembly 240 for coiling the stator and rotor components. In an embodiment, the radial body 246 is centrally mounted on a rotor shaft 260 via a bushing 262. The rotation of the rotor assembly 240 is transferred via the radial body 246 an the bushing 262 to cause rotation of the rotor shaft 260. In an embodiment, pinion 264 is mounted on a front end of the rotor shaft 260, or integrally formed at the front end of the rotor shaft 260, for coupling the rotor shaft 260 to transmission assembly 56.

In an embodiment, at least a front motor bearing 266 and a rear motor bearing 268 are mounted on the rotor shaft 260 and received within the cylindrical portion 222 of the stator mount 214. In an embodiment, rear motor bearing 268 is fully contained within an envelope defined by the radial ends of the stator core 212, whereas the front motor bearing 266 is disposed outside the envelope. In an embodiment, the rear motor bearing 268 abuts against the bushing 262. In an embodiment, the front motor bearing 266 is radially inward of the positional sensor board 226 such that a radial plane of the positional sensor board 226 intersects the front motor bearing 266. In an embodiment, a spacer 269 is disposed between the bearings 266 and 268. In an embodiment, the bearings 266 and 268 structurally support the rotor shaft 260 while allowing its free rotation within the stator assembly 210. The bearings 266 and 268 consequently structurally support the In an embodiment, transmission assembly 56 includes a transmission housing 57 that is substantially cylindrical and houses the cam carrier 22 and associated components, and a rear wall 270. The radial member 220 of the stator mount 214 is in contact with a rear surface of the rear wall 270 of the transmission assembly 56. In an embodiment, radial member 220 includes a center recessed portion 224 formed by an intermediary cylindrical portion 225 having a larger diameter than the cylindrical portion 222 and a smaller diameter than the outer periphery of the radial member 220. The center recessed portion 224 and the intermediary cylindrical portion 225 cooperatively form a cavity facing the transmission assembly 56. In an embodiment, the rear surface of the rear wall 270 of the transmission assembly 56 includes an annular center body 272 arranged to be form-fittingly received within the cavity. Further, in an embodiment, the outer periphery of the radial member 220 is radially constrained within an annular peripheral body 275 of the transmission assembly 56. In an embodiment, the rear wall 270 of the transmission assembly 56 is recessed relative to the annular peripheral body 275 and the annular center body 272, forming a cavity sized to receive the radial member 220 of the stator mount 214. This arrangement provides a support structure that pilots and radially supports the stator mount 214 directly to the transmission assembly 56 and thus relative to the power tool housing 52.

Further, in an embodiment, the outer periphery of the radial member 220 of the stator mount 214 includes a series of notches 228 formed therein in a radially-inward direction at predetermined locations, the rear surface of the rear wall 270 of the transmission assembly 56 includes a series of peripheral indentations 274 that project axially in the direction of the motor 200. The indentations 274 correspondingly engage the notches 228 of the radial member 220 to rotationally fix the stator mount 214 to the transmission assembly 56 and thus relative to the power tool housing 52.

In an embodiment, radial member 220 is axially constrained and is in direct contact with the rear wall 270 of the transmission assembly 56, and the center recessed portion 224 is axially constrained and is in contact with the cylindrical portion 222 of the transmission assembly 56. Further, in an embodiment, a radial wall 280 of the tool housing 52 projects radially between the motor 200 and the transmission assembly 56 around the annual center body 272 of the transmission assembly 56. In an embodiment, the radial member 220 of the stator mount 214 is disposed forward of the radial wall 280 and the rest of the motor assembly 200 is provided rearward of the radial wall 280. As such, the radial member 220 is axially clamped by the rear wall 270 of the transmission assembly 56 on one side and by the radial wall 280 of the power tool housing 52 on the other side. This arrangement ensures that the stator mount 214 is axially fixed relative to the transmission assembly 56 and the power tool housing 52. In an embodiment, the intermediary cylindrical portion 225 of the radial member 220 is received through a center opening of the radial wall 280 such that a radial plane of the radial wall 280 intersects the intermediary cylindrical portion 225.

In an embodiment, the cam carrier bearing 32 of the transmission assembly 56 is supported by at least a portion of the annular center body 272. In an embodiment, the radial plane of the radial member 220 of the stator mount 214 intersects a portion of the cam carrier bearing 32.

In an embodiment, a rear end cap 54 is mounted on the rear end of the power tool housing 52 behind the motor 200. In an embodiment, the rear end cap 54 captures the rear surface of the radial body 246 and the fan blades 248 of the rotor assembly 240, thus providing a baffle for the fan blades 248 to radially expel the air away from the motor 200. In an embodiment, the rear end cap 54 includes one or more radial openings 58 that allow the air to be radially expelled from the power tool 50. In an embodiment, since both bearings 266 and 268 are contained within the stator mount 214, the rear end cap 54 need not support a bearing of the rotor shaft 260 or make contact with any part of the motor 200. In other words, the entirety of the motor 200 is piloted and structurally supported by the transmission assembly 56, alone or in combination with the radial wall 280 of the tool housing 52. No part of the motor 200 is supported or in contact with the rear end cap 54 or the part of the tool housing 52 surrounding the motor 200. In an embodiment, a gap between the rear end cap 54 and the fan blades 248 is approximately 6 to 8 mm.

The embodiment described above provides a compact yet high power outer-rotor motor 200 having a small axial length suitable for many power tool applications such as drills, impact drivers, impact wrenches, etc. The stator assembly 210 of this embodiment is designed to be fully supported only on one side of the motor 200 by the transmission assembly 56 in cooperation with the radial wall 280 of the tool housing 52. Further, the rotor assembly 240 is merely supported by bearings provided within the stator mount 214, without any further support needed on the power tool end cap 54.

In an embodiment, motor 200 has a total length from the rearmost part of the motor (e.g., the radial body 246) to the frontmost part of the motor (e.g., front of the windings 113) of approximately 38 mm to 42 mm and a diameter as defined by the outer surface of the rotor assembly 240 of approximately of approximately 44 mm to 57 mm (e.g., approximately 51 mm). In an embodiment, a distance L2 between a front of the motor, in this example defined by the forwardmost part of the windings (not shown) and/or the frontmost part of the positional sensor board 226, to the rear of the cam carrier 22, is at smaller than or equal to 11.8 mm, preferably smaller than or equal to approximately 11.3 mm. Thus, the power tool 50 has a total length of approximately 115 to 122 mm, preferably smaller than or equal to 119.5 mm, even more preferably smaller than or equal to approximately 118.7 mm. In an embodiment, the motor 100 produces a maximum power output of at least 620 watts from a 20V max power tool battery pack.

A further and/or alternative embodiment of the invention is described with reference to FIGS. 8-11.

Figure 8:
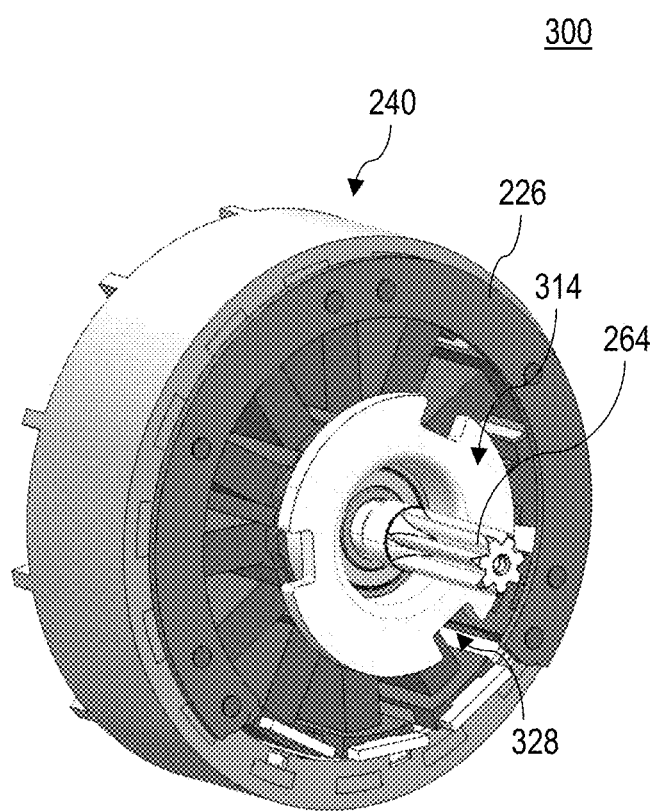
FIG. 8 depicts a perspective view of an outer-rotor BLDC motor, according to a second embodiment.
Figure 9:
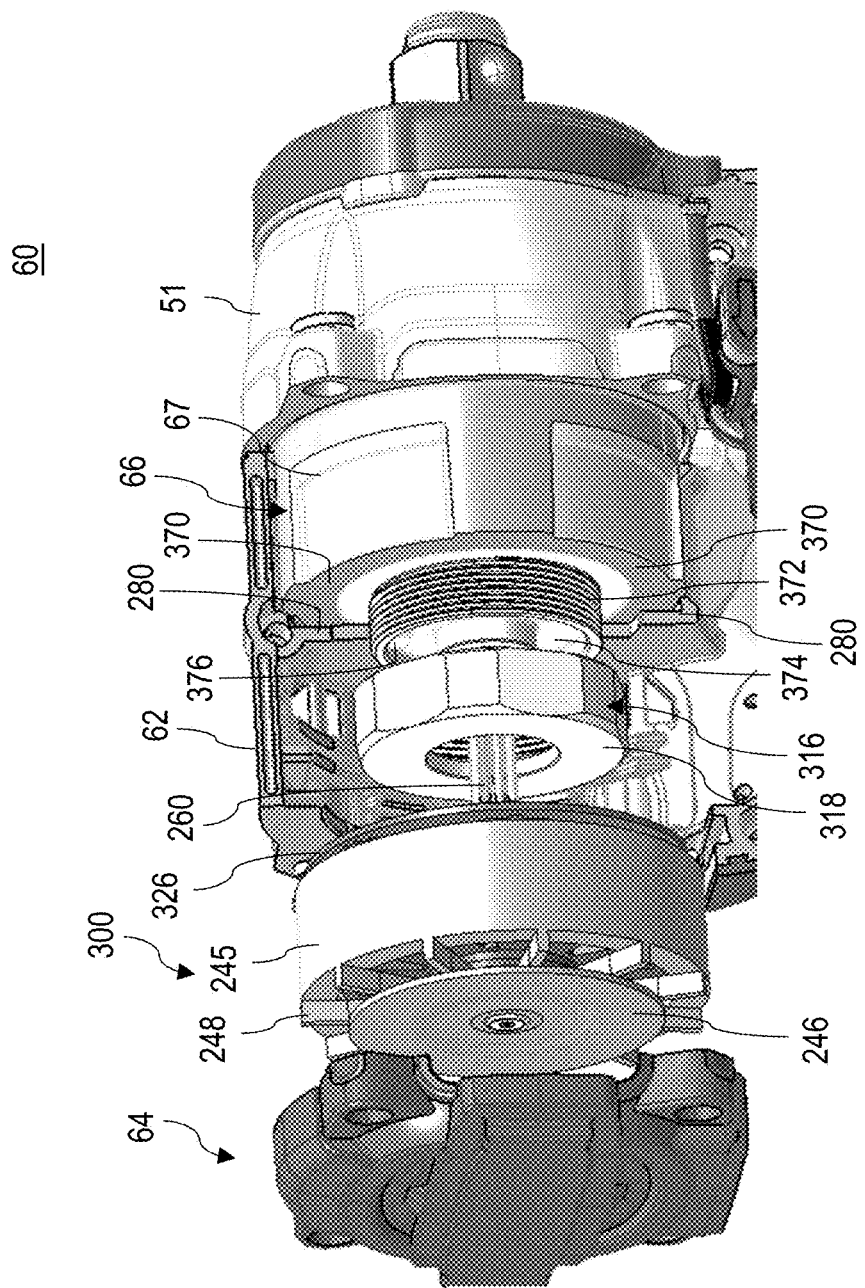
FIG. 9 depicts a partial exploded view of a power tool including the outer-rotor BLDC motor and a transmission assembly, according to an embodiment.
Figure 10:
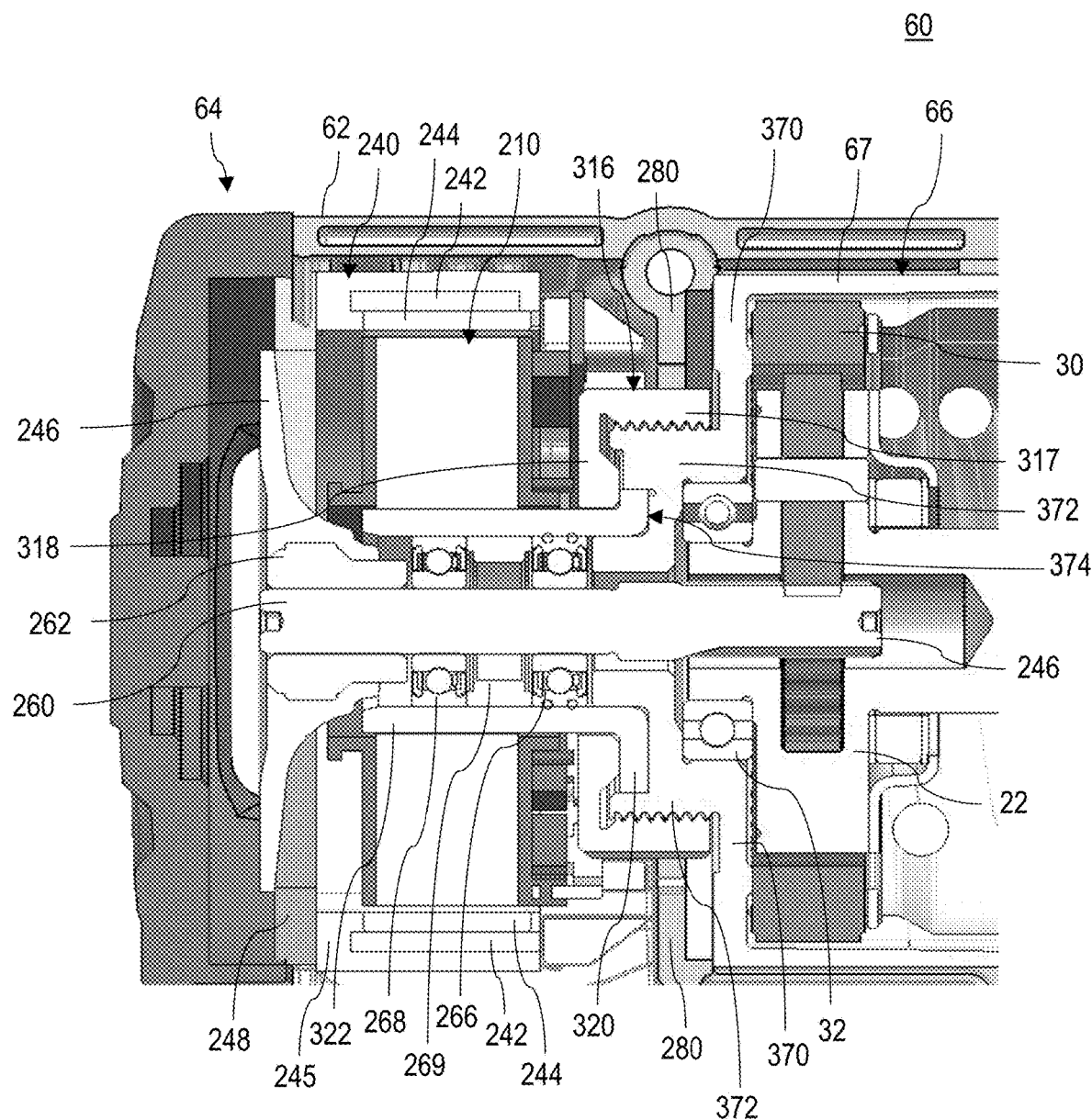
FIG. 10 depicts a partially cross-sectional view of the power tool including the outer-rotor BLDC motor, according to an embodiment.
Figure 11:
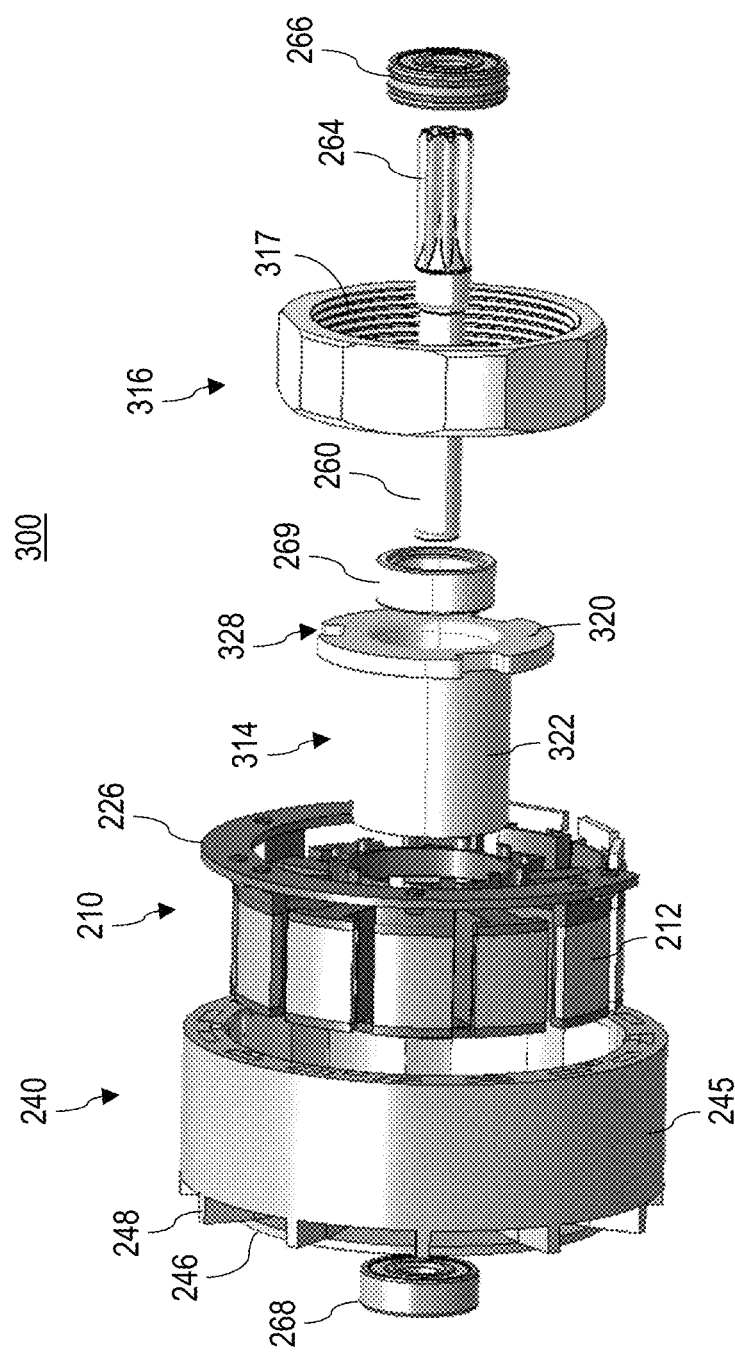
FIG. 11 depicts an exploded view of the outer-rotor BLDC motor, according to an embodiment.

FIG. 8 depicts a perspective view of an outer-rotor BLDC motor 300, according to a second embodiment of the invention. FIG. 9 depicts a partial exploded view of a power tool 60 including the outer-rotor BLDC motor 300 and a transmission assembly 66, according to an embodiment. FIG. 10 depicts a partially cross-sectional view of the power tool 60 including the outer-rotor BLDC motor 300, according to an embodiment. FIG. 11 depicts an exploded view of the outer-rotor BLDC motor 300, according to an embodiment.

In an embodiment, power tool 60 includes many of the same features as power tools 10 and/or 50 described above, including but not limited to, a power tool housing 62 including two clamshells that come together to house the motor 300, and a nosecone 61 that houses an impact mechanism (not shown). The transmission assembly 66 is disposed between the motor 300 and the impact mechanism and cooperates with the impact mechanism to selectively impart rotary motion and/or a rotary impact motion to an output spindle. In an embodiment, transmission assembly 66 includes a transmission housing 67 that is substantially cylindrical and houses the cam carrier 22 and associated components, and a rear wall 370. In an embodiment, tool housing 62 and transmission assembly 66 respectively include many of the same features of tool housing and transmission assembly previously discussed, with some differences discussed below in detail. To the extent that these or other power tool components include identical or similar features as described above, the same reference numerals are used.

In an embodiment, the motor 300 includes many of the same features as motor 200 described above, and to the same extent that identical or similar features are incorporated in motor 300, the same reference numerals are used. In an embodiment, motor 300 includes a modified stator mount 314 design. The rear wall 370 of the transmission assembly 66 also includes a modified design for retention of the stator mount 314. In an embodiment, a lock ring 316 is utilized to secure the stator mount 314 to the transmission assembly 66. These features are described here in detail.

In an embodiment, the stator mount 314 includes an elongated cylindrical portion 322 sized to be received securely within a central aperture of the stator lamination stack 212. In an embodiment, the stator lamination stack 212 may be press-fitted over the cylindrical portion 322 of the stator mount 314. In an embodiment, stator mount 314 further includes a radial member 320 at an end of the cylindrical portion 322 outside the body of the stator lamination stack 212. In an embodiment, radial member 320 is formed as an outward projecting rim from the end of the cylindrical portion 322. In an embodiment, notches 228 are formed at predetermined locations in the peripheral edge of the radial member 320.

In an embodiment, the rear wall 370 of the transmission assembly 66 is integrally formed with an annular body 372 projecting in the direction of the motor 300. In an embodiment, the annular body 372 forms a bearing holder facing the cam carrier 22 that securely receives the cam carrier bearing 32 therein and thus pilots and supports the cam carrier 22 relative to the transmission assembly 66. In an embodiment, annular body 372 includes a diameter that is smaller than the outer diameter of transmission assembly 66, but greater than the outer diameter of the radial member 320 of the stator mount 314. In an embodiment, the outer surface of the annular body 372 is threaded. A rear surface 374 of the annular body 372 opposite the cam carrier bearing 32 is slightly recessed relative to the rear end of its outer surface and sized to receive and engage the radial member 320 of the stator mount 314. This arrangement ensures that the stator mount 314 is radially fixed relative to the transmission assembly 66 and thus radially piloted to the power tool housing 62. In an embodiment, the rear surface 374 of the annular body 372 includes one or more projecting indentations 376 arranged to engage the notches 228 of the stator mount 314. Engagement of the indentations 376 and the notches 228 rotationally fixes the stator mount 314 to the transmission assembly 66 and the power tool housing 62.

In an embodiment, lock ring 316 includes a nut-shaped main portion 317 having a threaded inner surface and a radial portion 318. The nut-shaped main portion 317 is sized to be fastened onto the annular body 372. The radial portion 318 includes an inner opening having a slightly larger inner diameter than the outer diameter of the cylindrical portion 322 of the stator mount 314. The cylindrical portion 322 is received through the inner opening of the radial portion 328, and the radial portion 318 clamps the radial member 320 of the stator mount 314 against the rear surface 374 of the annular body 372 of the transmission assembly 66 when the lock ring 316 is fastened onto the annular body 372. This arrangement ensures that the stator mount 314 is axially fixed and structurally secured to the transmission assembly 66 and the power tool housing 62.

In an embodiment, lock ring 316 is slid over the cylindrical portion 322, thus capturing the radial member 320 of the stator mount 314, before the stator assembly 210 is tightly mounted on the cylindrical portion 322. In an embodiment, the lock ring 316 and the annular body 372 are both partially received within the center opening formed by the radial wall 280 of the tool housing 62.

In an embodiment, the cam carrier bearing 32 of the transmission assembly 66 is supported by at least a portion of the annular body 372. In an embodiment, a radial plane that intersects a front portion of the lock ring 316 also radially intersects a portion of the cam carrier bearing 32.

With this arrangement, like the previous embodiment, the stator assembly 210 is fully supported only on one side of the motor 200 by the transmission assembly 66. Unlike the previous embodiment, however, the radial wall 280 of the power tool housing 62 is not relied on to axially fix the stator mount 314 to the transmission assembly 66. Rather, the lock ring 316 is configured to fully fix and support the stator mount 314 to the transmission assembly 66 independently of the power tool housing 62.

A further and/or alternative embodiment of the invention is described with reference to FIGS. 12-18.

Figure 12:
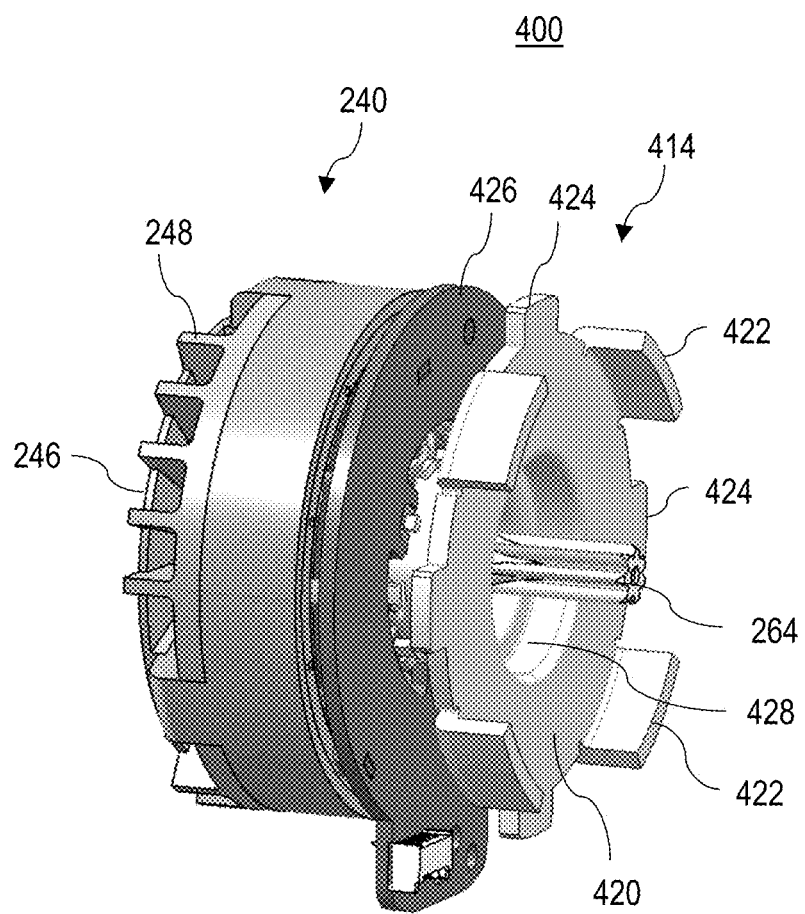
FIG. 12 depicts a perspective view of an outer-rotor BLDC motor, according to a third embodiment.
Figure 13:
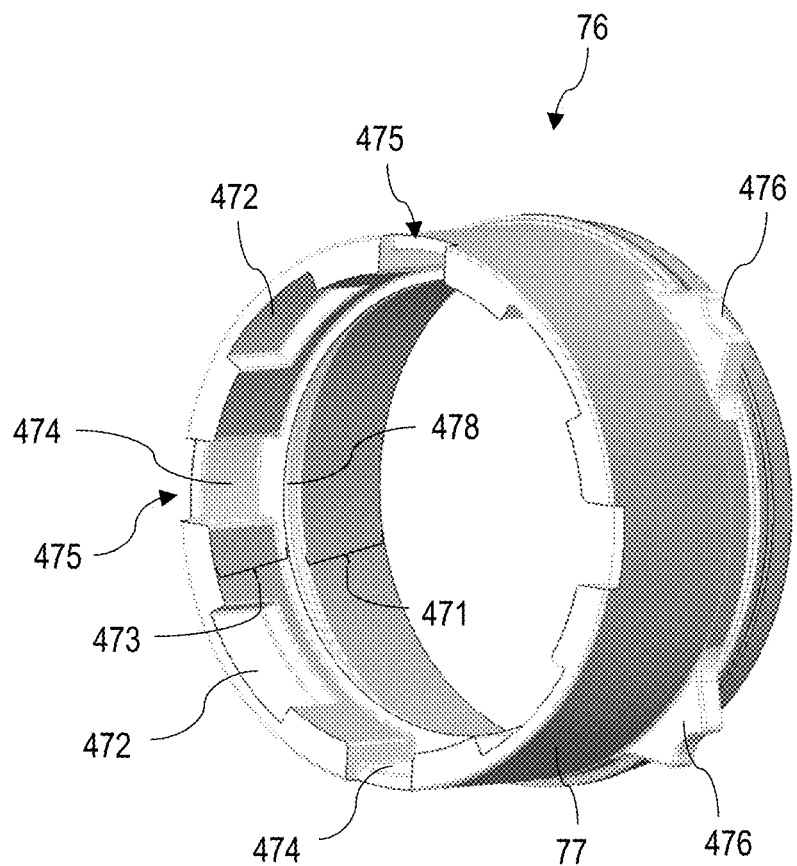
FIG. 13 depicts a perspective view of a transmission assembly configured for coupling with the motor, according to an embodiment.
Figure 14:
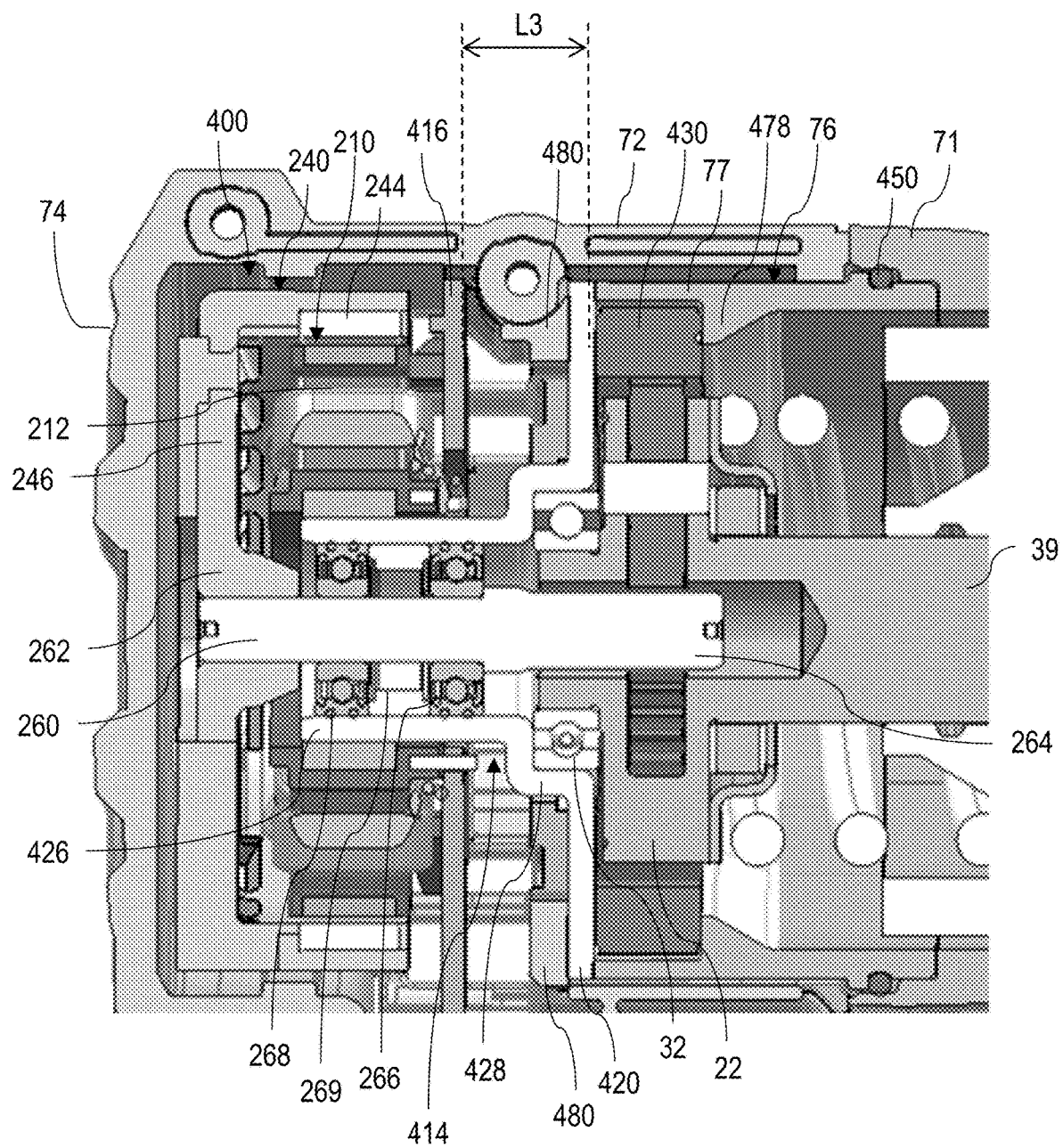
FIG. 14 depicts a partial cross-sectional view of the power tool including the motor and the transmission assembly, according to an embodiment.

FIG. 12 depicts a perspective view of an outer-rotor BLDC motor 400, according to a third embodiment of the invention. FIG. 13 depicts a perspective view of a transmission assembly 76 configured for coupling with the motor 400, according to an embodiment. FIG. 14 depicts a partial cross-sectional view of the power tool 70 including the motor 400 and the transmission assembly 76, according to an embodiment.

In an embodiment, power tool 70 includes many of the same features as the various power tools described above, including but not limited to, a power tool housing 72 including two clamshells that come together to house the motor 400, and a nosecone 71 that houses an impact mechanism (not shown). The transmission assembly 76 is disposed between the motor 400 and the impact mechanism and cooperates with the impact mechanism to selectively impart rotary motion and/or a rotary impact motion to an output spindle. In an embodiment, tool housing 72 and transmission assembly 76 respectively include many of the same features of tool housing and transmission assembly previously discussed, with some differences discussed below in detail. To the extent that these or other power tool components include identical or similar features as described above, the same reference numerals are used.

In an embodiment, motor 400 includes many of the same features as motors 100-300 described above, and to the same extent that identical or similar features are incorporated in motor 400, the same reference numerals are used. In an embodiment, motor 400 includes a positional sensor board 416 which, similarly to positional sensor board 226 described above, senses a rotational position of the rotor. The motor 400 further includes a modified stator mount 414 design and the transmission assembly 76 also includes a corresponding modified design for coupling with and retention of the stator mount 414. Specifically, in an embodiment, stator mount 414 includes a series of axial and radial tabs 422 and 424 that extend peripherally from a radial member 420 of the stator mount 414 and are coupled to a rear end of a transmission housing 77 of the transmission assembly 76 having a substantially cylindrical body to radially and rotationally fix the stator mount 414 to the transmission assembly 76. These features are described here in detail.

In an embodiment, the stator mount 414 includes an elongated cylindrical portion 426 sized to be received securely within a central aperture of the stator lamination stack 212. In an embodiment, the stator lamination stack 212 may be press-fitted over the cylindrical portion 426 of the stator mount 414. In an embodiment, stator mount 414 further includes a radial member 420 at an end of the cylindrical portion 426 outside the body of the stator lamination stack 212. In an embodiment, radial member 420 includes a stepped portion 414 that forms a bearing holder facing the cam carrier 22 for receiving the cam carrier bearing 32. In an embodiment, the radial member 420 has an outer diameter that is slightly smaller than the outer diameter of the transmission housing 77 by approximately 2 to 5 mm. In an embodiment, the axial tabs 422 and radial tabs 424 (in this example four axial tabs 422 and four radial tabs 424 alternatively arranged) extend axially and radially outwardly, respectively, from the outer periphery of the radial member 420. In an embodiment, an outer periphery formed by distal edges of the radial tabs 424 includes approximately the same diameter as the outer diameter of the transmission housing 77.

In an embodiment, the transmission assembly 76 includes a front portion 471 that is at least partially received within the nosecone 71 and a rear portion 473 that is configured to receive and securely house a ring gear 430. An inner annular projection 478 separating the front portion 471 and the rear 473 forms a radial wall against which the ring gear 430 abuts.

In an embodiment, the rear portion 473 of the transmission assembly 76 includes a series of first recessed surfaces 472 and a series of second recessed surfaces 474 alternatingly formed in its inner surface and extending axially from its rear surface. In an embodiment, the rear surface of the transmission housing 77 includes notches 475 aligned with the second recessed surfaces 474. In an embodiment, the axial tabs 422 of the stator mount 414 are slip-fit along the first recessed surfaces 472 to secure the stator mount 414, rotationally and radially, to the transmission assembly 76. In an embodiment, the ring gear 430 includes a series of (in this example four) outer tabs 440 that are slidingly received in engagement with the second recessed surfaces 474 to secure the ring gear 430 within the rear portion 473 of the transmission assembly 76. In an embodiment, radial tabs 424 of the stator mount 414 are received into the notches 475 of the transmission assembly 76 to provide additional rotational support for the stator mount 414 relative to the transmission assembly 76. In an embodiment, the radial member 420, with mated with the transmission housing 77 in this manner, substantially seals the transmission assembly 70.

Figure 15:
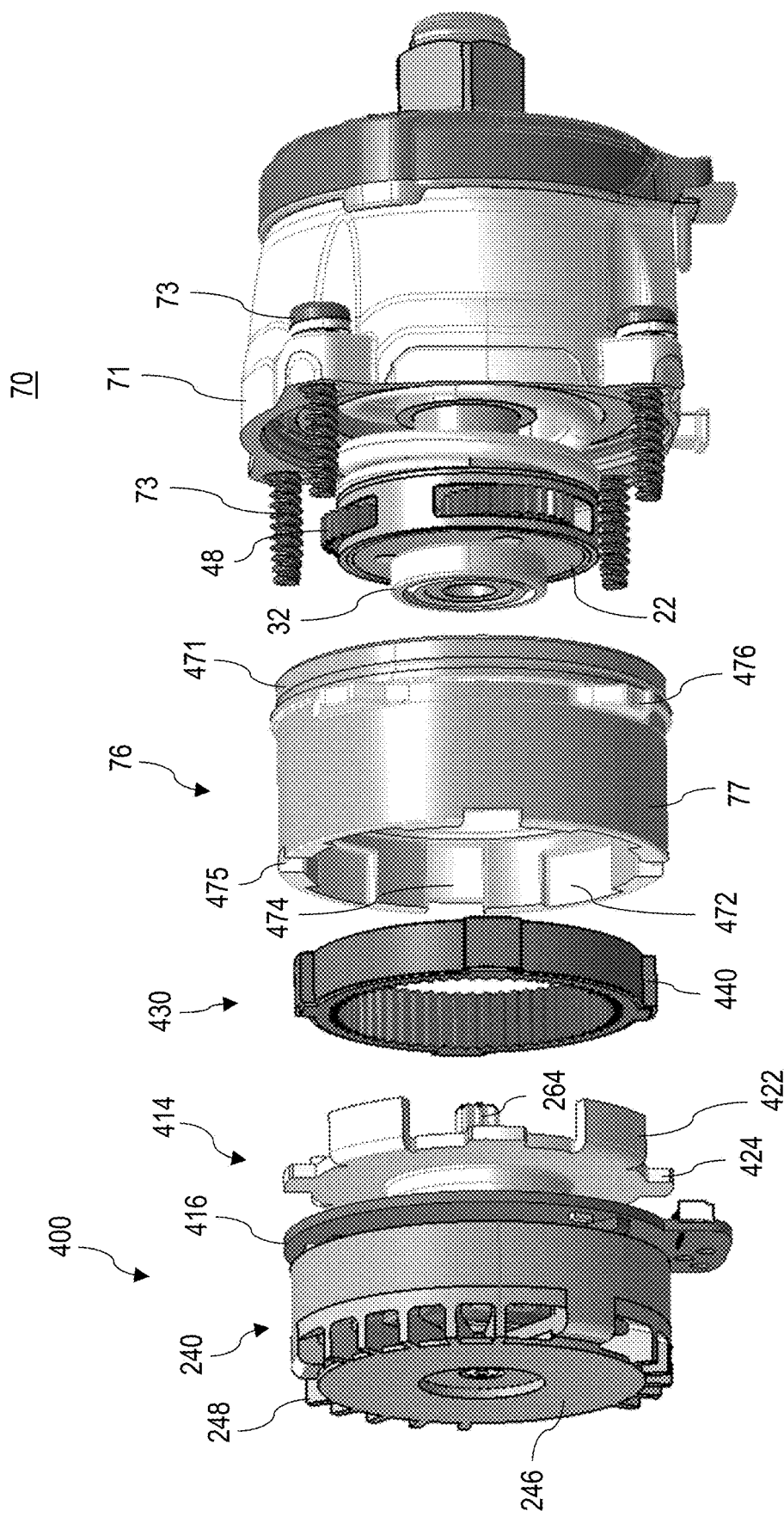
FIG. 15 depicts a partial exploded view of a power tool including the motor and the transmission assembly, according to an embodiment.
Figure 16:
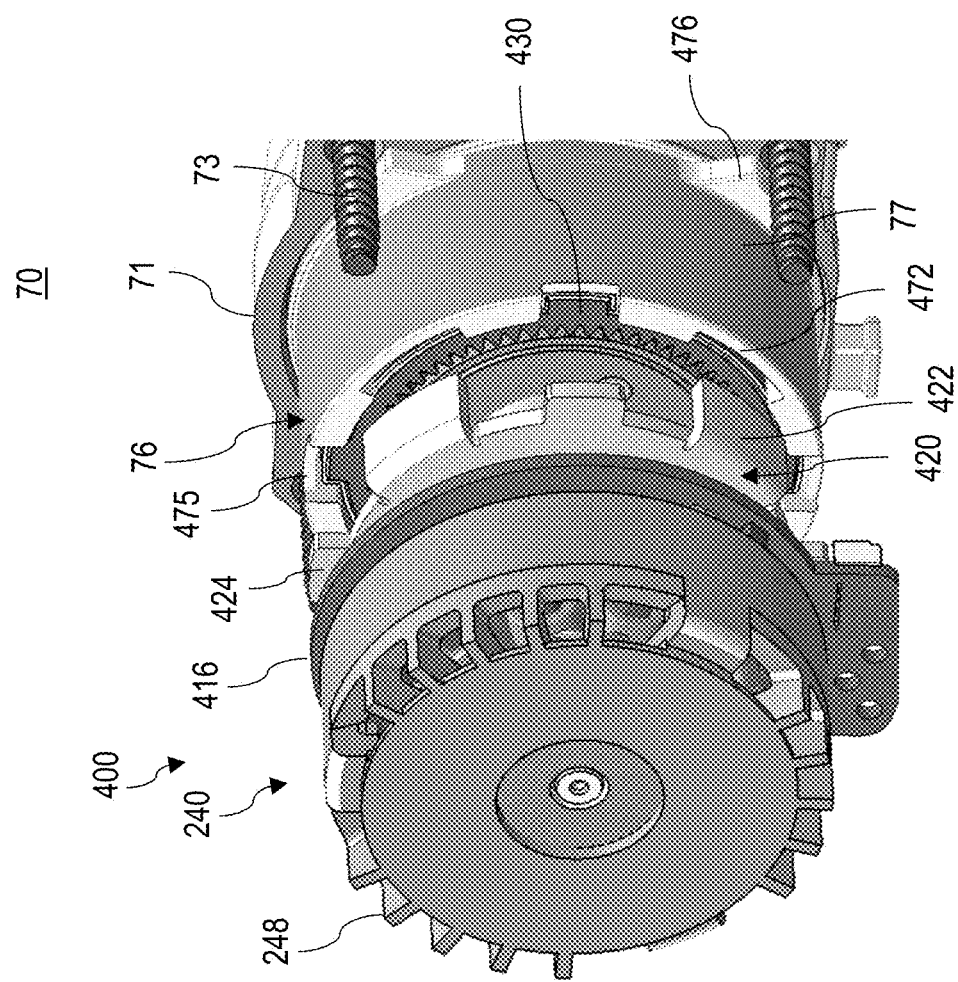
FIG. 16 depicts another partial exploded view of the power tool prior to mounting of the motor to the transmission assembly, according to an embodiment.
Figure 17:
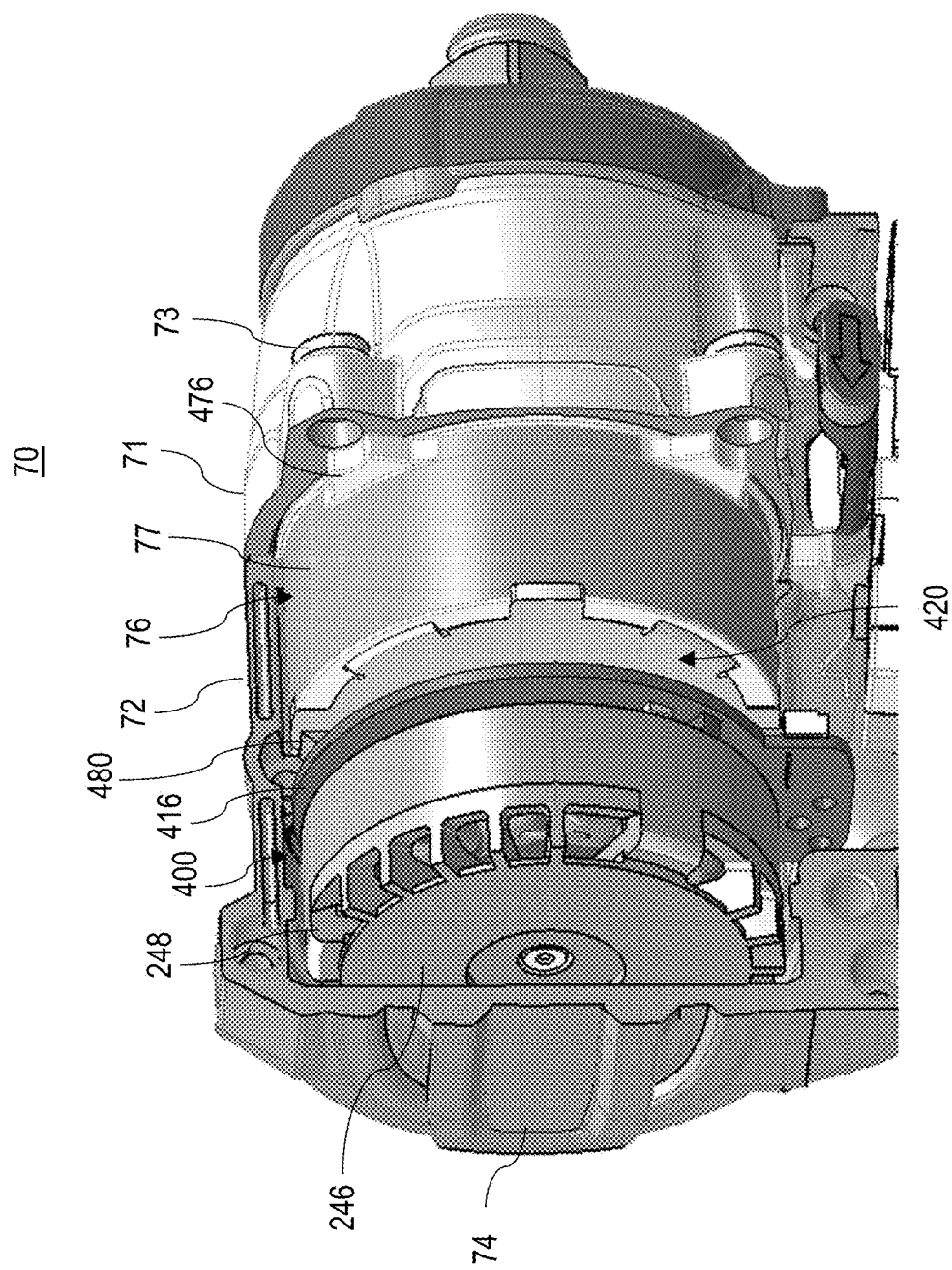
FIG. 17 depicts a partial perspective view of the power tool with a housing half removed to show the motor and the transmission assembly, according to an embodiment.
Figure 18:
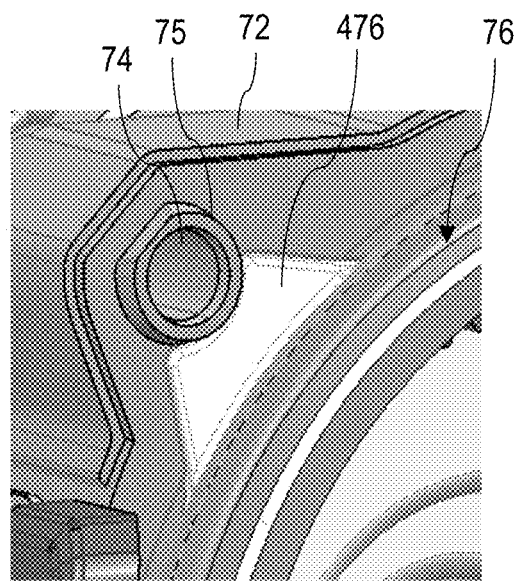
FIG. 18 depicts zoomed-in view of the transmission assembly and the tool housing, according to an embodiment.

FIG. 15 depicts a partial exploded view of a power tool 70 including the motor 400 and the transmission assembly 76, according to an embodiment. FIG. 16 depicts another partial exploded view of the power tool 70 prior to mounting of the motor 400 to the transmission assembly 76, according to an embodiment. FIG. 17 depicts a partial perspective view of the power tool 70 with a housing half removed to show the motor 400 and the transmission assembly 76, according to an embodiment. FIG. 18 depicts zoomed-in view of the transmission assembly 76 and the tool housing 72, according to an embodiment.

During the assembly process, as seen in FIGS. 15 and 16, the front portion 471 of the transmission assembly 76 is mounted into the nosecone 71 and the rear portion 473 is positioned to house the cam carrier 22, with the ring gear 430 being in radial alignment with the planet gears 48 of the cam carrier 22. In an embodiment, an O-ring 450 is received between the front portion 471 and the nosecone 71 to radially secure the transmission assembly 76. In an embodiment, the motor 400, including the stator mount 414, is mounted onto the transmission assembly 76, with the axial tabs 422 fitted along the first recessed surfaces 472 and the radial tabs 424 received into the recessed regions 475 of the transmission assembly 76.

In an embodiment, as shown in FIGS. 17 and 18, the entire assembly is then placed in the tool housing 72. In an embodiment, the tool housing 72 includes a series of threaded openings 74 facing the nosecone 71. A series of fasteners 73 are received into the threaded openings 74 to secure the nosecone 71 to the tool housing 72. In an embodiment, the tool housing 72 includes annular rims 75 formed around the threaded openings 74. In an embodiment, the front portion 471 of the transmission assembly 76 includes outer protrusions 476 having rounded outer edges. When fully assembled, the rounded edges of the outer protrusions 476 rest against the annular rims 75 of the tool housing 72 to rotational lock the transmission assembly 76 relative to the tool housing 72. Further, the tool housing 72 includes a radial wall 480 that projects radially between the motor 400 and the transmission assembly 76 and engages the rear surface of the radial member 420 of the stator mount 414. The radial wall 480 axially constrains the stator mount 414 against the transmission assembly 76, and in turn, the transmission assembly 76 against the nosecone 71. In this manner, the tool housing 72 cooperates with the nosecone 71 to rotationally and axially pilot and support the transmission assembly 76 and the stator mount 416.

The above-described arrangement provides a structure whereby, like the previous embodiments, the stator assembly 210 is fully supported only on one side of the motor 400 by the transmission assembly 76. However, unlike the previous embodiments, where the retention features of the stator mount are located between the transmission assembly and the stator assembly, the stator mount 416 of the above embodiment is locked into the transmission housing 77. In other words, the retention features required for axial, rotational, and radial piloting and support of the stator mount 416 are located radially outwardly of the ring gear 430 and the cam carrier bearing 32, and do not occupy the space between the stator mount 416 and the transmission assembly 76 along the axial direction. This arrangement thus reducing the axial length of the power tool 70.

In an embodiment, a distance L3 between a front of the motor 400, in this example defined by the forwardmost part of the windings (not shown) and/or the frontmost part of the positional sensor board 416, to the rear of the cam carrier 22, is smaller than or equal to approximately 10.3 mm, preferably smaller than or equal to approximately 9.9 mm. Thus, where the motor performance, diameter and length are the same as motor 200 described above, this arrangement allows the total length of the tool to be reduced by an additional 1.4 mm, preferably to a total length smaller than or equal to 118.4 mm, even more preferably smaller than or equal to approximately 117.3 mm.

A further and/or alternative embodiment of the invention is described with reference to FIGS. 19-22.

Figure 19:
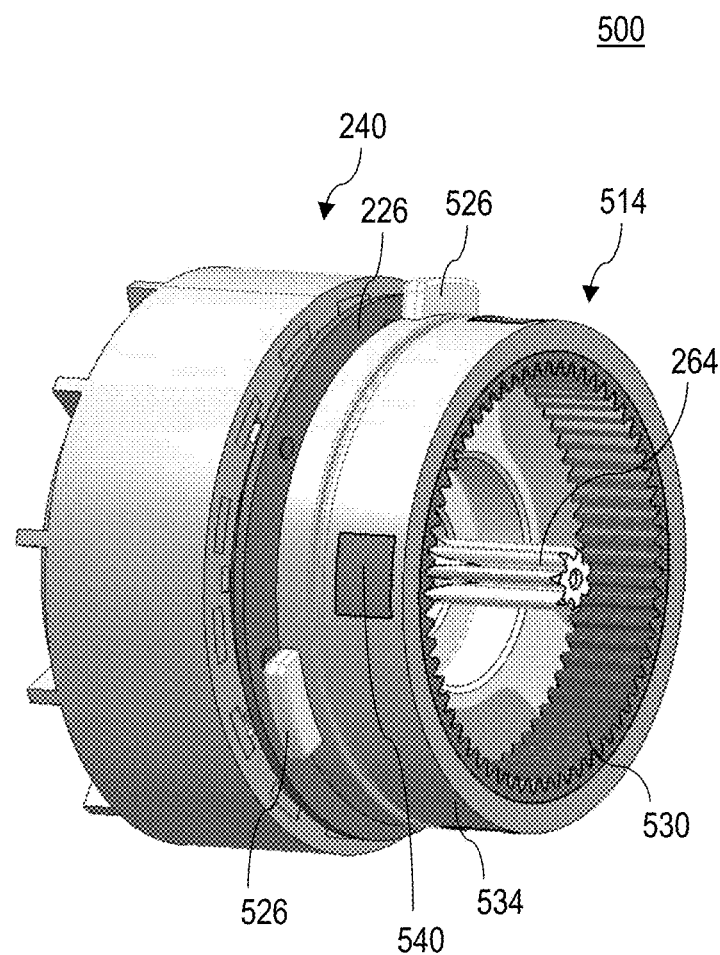
FIG. 19 depicts a perspective view of an outer-rotor BLDC motor, according to a fourth embodiment.
Figure 20:
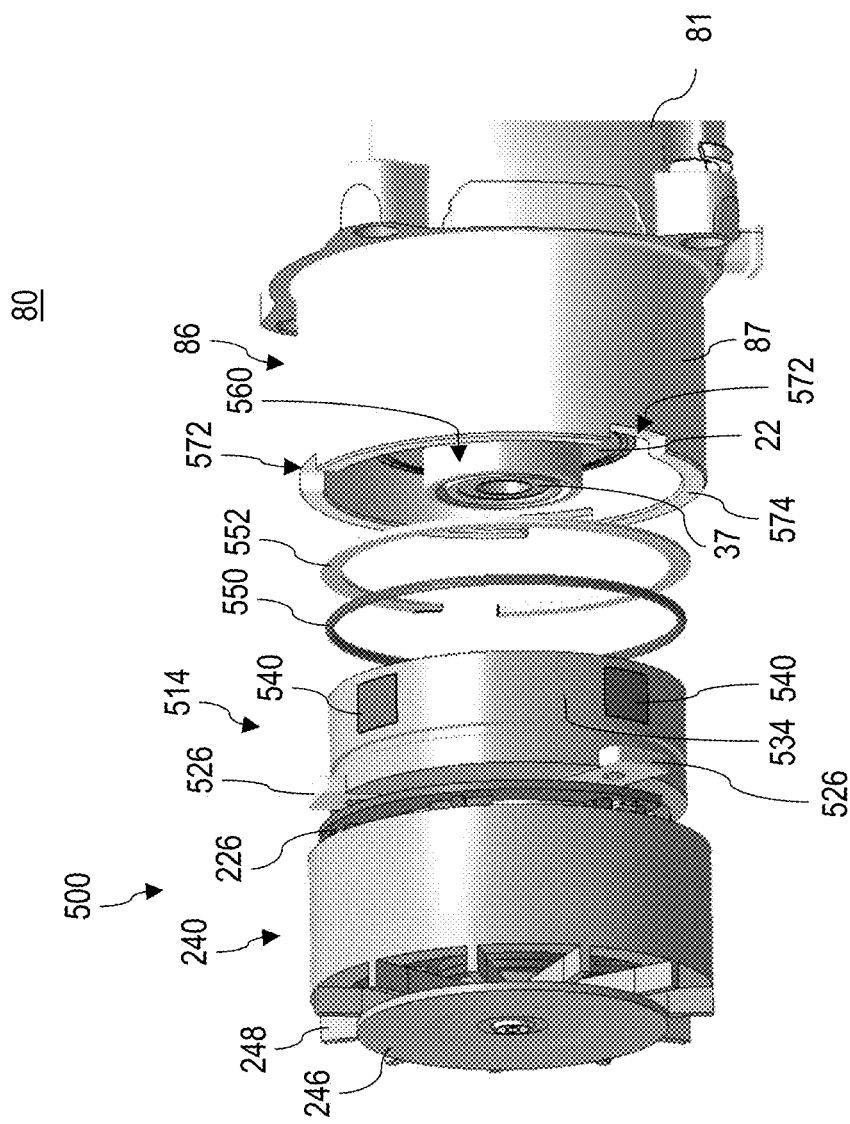
FIG. 20 depicts a partial exploded view of a power tool provided with the outer-rotor BLDC motor and a transmission assembly, according to an embodiment.
Figure 21:
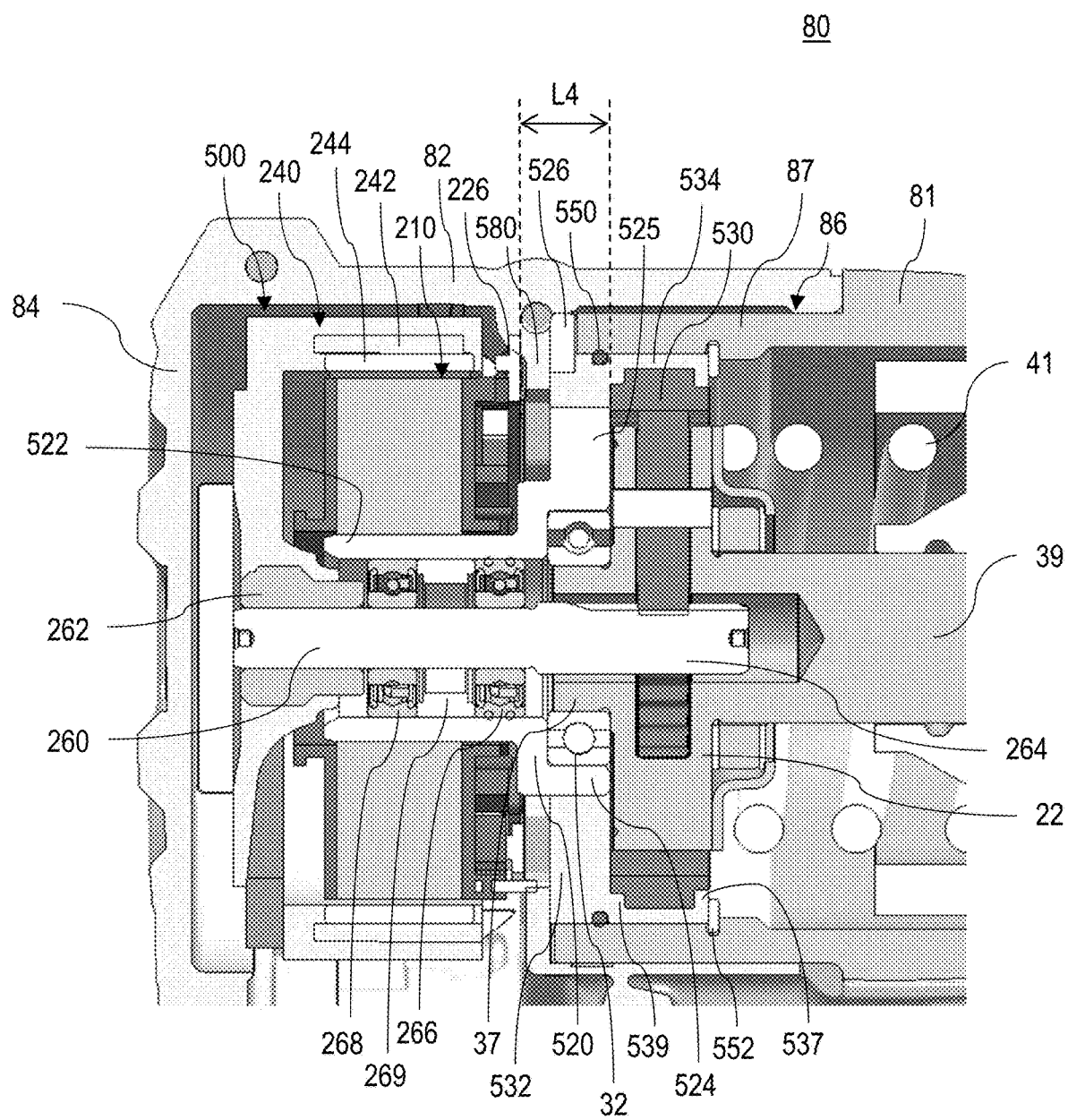
FIG. 21 depicts a partially cross-sectional view of the power tool including the outer-rotor BLDC motor and the transmission assembly, according to an embodiment.
Figure 22:
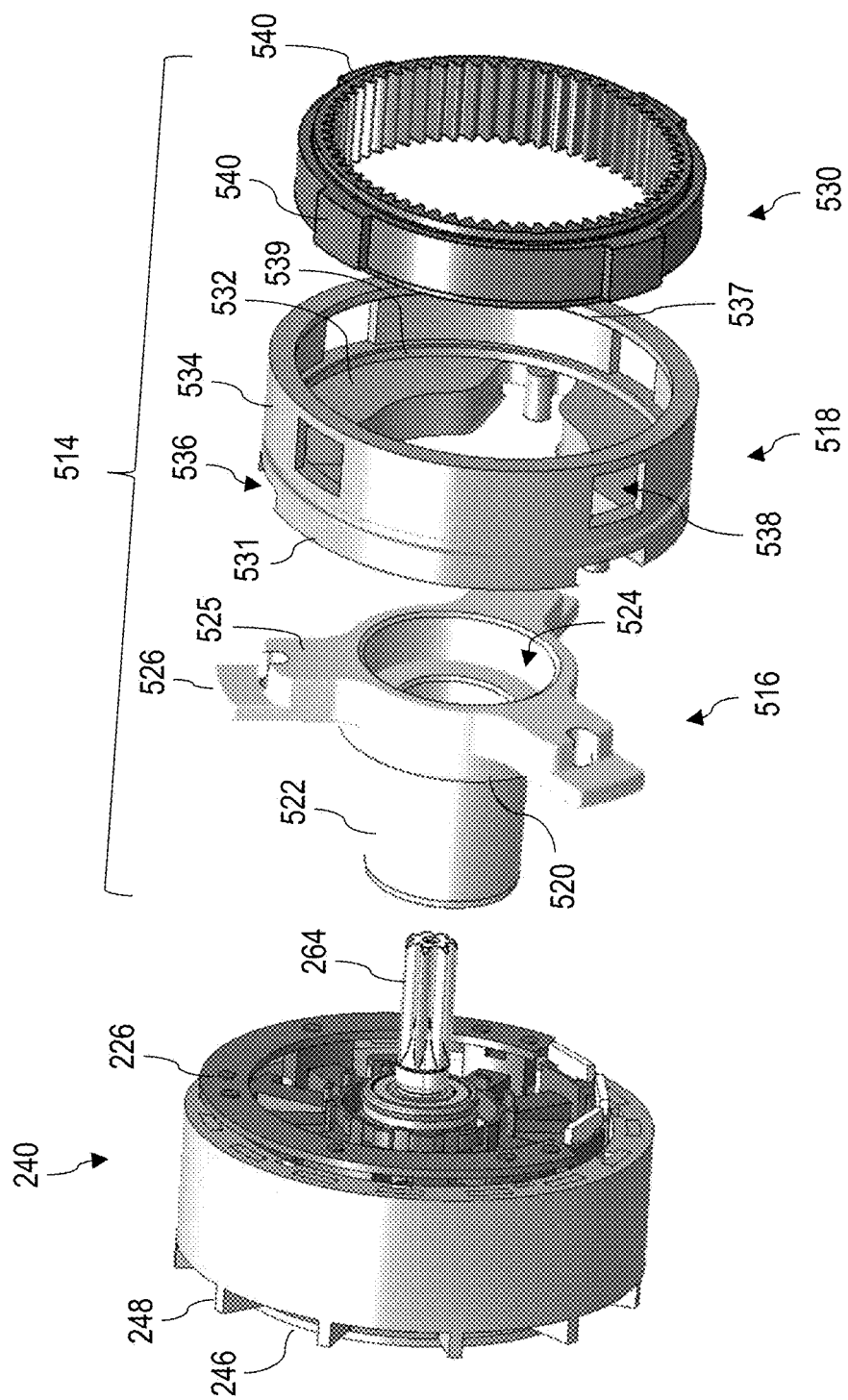
FIG. 22 depicts a partially exploded view of the outer-rotor BLDC motor, according to an embodiment.

FIG. 19 depicts a perspective view of an outer-rotor BLDC motor 500, according to a fourth embodiment of the invention. FIG. 20 depicts a partial exploded view of a power tool 80 provided with the outer-rotor BLDC motor 500 and a transmission assembly 86, according to an embodiment. FIG. 21 depicts a partially cross-sectional view of the power tool 80 including the outer-rotor BLDC motor 500 and the transmission assembly 86, according to an embodiment. FIG. 22 depicts a partially exploded view of the outer-rotor BLDC motor 500, according to an embodiment.

In an embodiment, power tool 80 includes many of the same features as the above-described power tools, including but not limited to, a power tool housing 82 including two clamshells that come together to house the motor 500, and a nosecone 81 that houses an impact mechanism (not shown). The transmission assembly 86 is disposed between the motor 500 and the impact mechanism and cooperates with the impact mechanism to selectively impart rotary motion and/or a rotary impact motion to an output spindle. In an embodiment, tool housing 82 and transmission assembly 86 respectively include many of the same features of tool housing and transmission assembly previously discussed, with some differences discussed below in detail. To the extent that these or other power tool components include identical or similar features as described above, the same reference numerals are used.

In an embodiment, motor 500 includes many of the same features as the motors 200-400 described above, and to the extent that identical or similar features are incorporated in motor 500, the same reference numerals are used. Similarly, the transmission assembly 86 includes many of the same features as transmission assemblies described above, and to the extent that identical or similar features are incorporated in, the same reference numerals are used. In an embodiment, unlike the previous embodiments, motor 500 includes a stator mount assembly 514 having an integrated mounting member 518 that supports the stator on one side and includes a ring gear mount 534 for supporting a ring gear 530 on the other side. Accordingly, in an embodiment, some components of the transmission assembly 86, including the ring gear 530 and the associated planet gears of the cam carrier 22, are at least partially nested within the integrated mounting member 518. Integration of the ring gear mount 534 and the ring gear 530 to the motor assembly contributes to a reduction in axial length of the power tool 80. Details of the stator mount assembly 514 and the transmission assembly 86 are discussed below.

In an embodiment, stator mount assembly 514 includes a stator mount 516. Stator mount 516 includes an elongated cylindrical portion 522 sized to be received securely within a central aperture of the stator lamination stack 212. In an embodiment, the stator lamination stack 212 may be press-fitted over the cylindrical portion 522 of the stator mount 516. In an embodiment, stator mount 516 further includes a radial member 520 extending radially from an end of the cylindrical portion 522 outside the body of the stator lamination stack 212. In an embodiment, an annular body extends from the radial member 520 opposite the cylindrical portion 522, where the inner surface of the annular body 524 has a larger diameter than the inner diameter of the cylindrical portion 522. In an embodiment, a series of radial arms 525 (in this example, three radial arms 525) extend radially outwardly from the outer surface of the annular body 524, each arm 525 forming an outer protrusion 526 that extends further out than the main body of the radial arm 525.

In an embodiment, stator mount assembly 514 additionally includes the integrated mounting member 518, which is designed to couple to and structurally support the stator mount 516 on one side and integrally support the ring gear 530 on the other side. In an embodiment, integrated mounting member 518 is a molded structure formed around the stator mount 516.

In an embodiment, the integrated mounting member 518 includes a radial member 532 that radially occupies spaces between the arms 525 of the stator mount 516 and together with the arms 525 forms a radial partitioning wall separating the stator mount 516 from the transmission assembly 86. An annular portion 531 of the integrated mounting member 518 extending rearward from the radial member 532 includes a first series of peripheral openings 536 through which the outer protrusions 526 of the radial arms 525 are radially received.

In an embodiment, the integrated mounting member 518 further includes the ring gear mount 534 having a generally cylindrical peripheral body for supporting the ring gear 530. The ring gear 530, which is conventionally provided in the transmission assembly separately from the motor, is incorporated into the integrated mounting member 518 and supported within the ring gear mount 534 adjacent the stator mount 516 opposite the radial partitioning wall. The ring gear mount 534 includes a series of second openings 538 that receive outer tabs 540 of the ring gear 530 to rotationally secure the ring gear 530. The ring gear mount 534 further includes inner rims 537 and 539 that engage axial ends of the ring gear 530. These features provide a structure whereby the integrated mounting member 518 axially, radially and rotationally constrains and affixes the ring gear 530 and the stator mount 516 relative to one another.

In an embodiment, the transmission assembly 86 includes a transmission housing 87 that is substantially cylindrical and extends integrally from the nosecone 81 with a rear end 574 thereof facing the motor 500. The integrated mounting member 518 is form-fittingly received within the transmission housing 87 through rear end 574 thereof. A C-clip 552 is provided to axially stop a front end of the ring gear mount 534. The C-clip 552 positions the radial partitioning wall (formed by the radial member 532 of the integrated mounting member 518 and the arms 525 of the stator mount 516) adjacent the cam carrier 22 of the transmission assembly 86 and radially aligns the ring gear 530 with the planet gears of the cam carrier 22. In an embodiment, the transmission housing 87 includes an annular groove to securely receive the C-clip 552. The integrated mounting member 518 is further radially and axially secured to the transmission housing 87 of the transmission assembly 86 via an O-ring 550. In an embodiment, the integrated mounting member 518 and transmission housing 87 are provided with corresponding annular grooves to receive the O-ring 550. In an embodiment, the O-ring 550 cooperates with the integrated mounting member 518 to substantially seal the transmission assembly 86.

In an embodiment, the rear end 574 includes a series of notches 572 that receive the outer protrusions 526 of the radial arms 525 of the stator mount 516, thus rotationally affixing the stator mount assembly 514 to the transmission assembly 86. Further, in an embodiment, once assembled inside the tool housing 82, a rear surface of the radial partitioning wall (i.e., the radial member 532 and the arms 525) rests against a radial wall 580 of the tool housing 82 to hold the ring gear mount 534 against the C-clip and thus axially secure the stator mount assembly 514 to the transmission assembly 86. These features cooperate to constrain and affix the stator mount assembly 514 relative to the transmission assembly 86 and the tool housing 82 in axial, radial and rotational directions.

In an embodiment, an outer race of the cam carrier bearing 32 of the transmission assembly 86 is received and supported within the annular body 524 of the stator mount 526. Accordingly, the cam carrier bearing 32 is piloted to and supported by the stator mount assembly 514. In an embodiment, both the ring gear 530 and the cam carrier bearing 32 may be pre-assembled into the stator mount assembly 514 prior to assembly of the transmission assembly 86 and the moto 500 within the power tool 80.

In an embodiment, integration of the ring gear 530 and the cam carrier bearing 32 into the stator mount assembly 514 provides a structure in which features required to structurally support the stator mount 516 are integrated radially outwardly of the ring gear 530 and the cam carrier bearing 32, thus reducing the axial length of the power tool.

In an embodiment, a distance L4 between a front of the motor 500, in this example defined by the forwardmost part of the windings (not shown) and/or the frontmost part of the positional sensor board 226, to the rear of the cam carrier 22, is smaller than or equal to approximately 7.7 mm, preferably smaller than or equal to approximately 7.2 mm. Thus, where the motor performance, diameter and length are the same as motor 200 described above, this arrangement allows the total length of the tool to be reduced by approximately an additional 4.1 mm, preferably to a total length smaller than or equal to approximately 115.8 mm, even more preferably smaller than or equal to approximately 114.6 mm.

Figure 24:
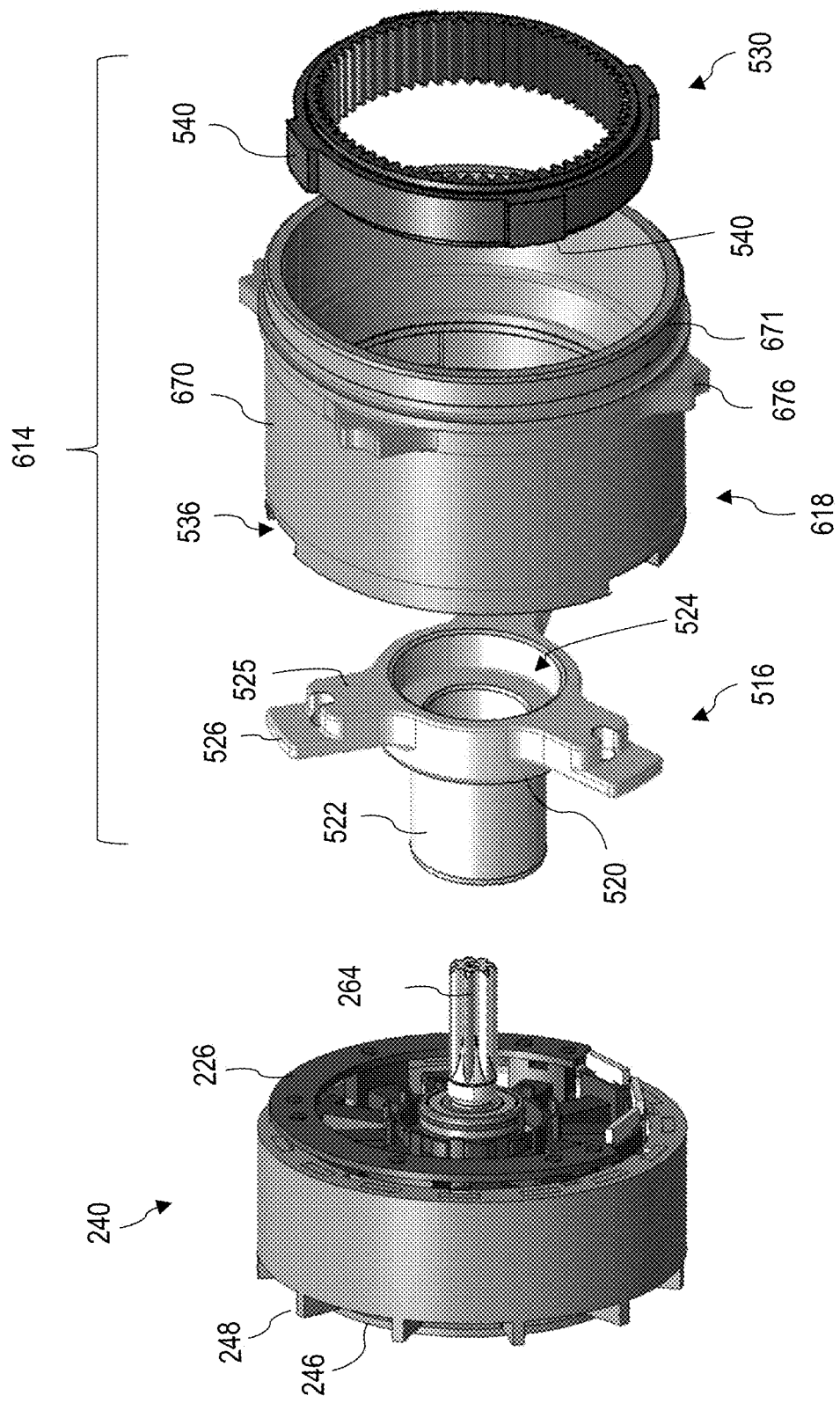
FIG. 24 depicts a partially exploded view of the outer-rotor BLDC motor, according to an embodiment.
Figure 25:
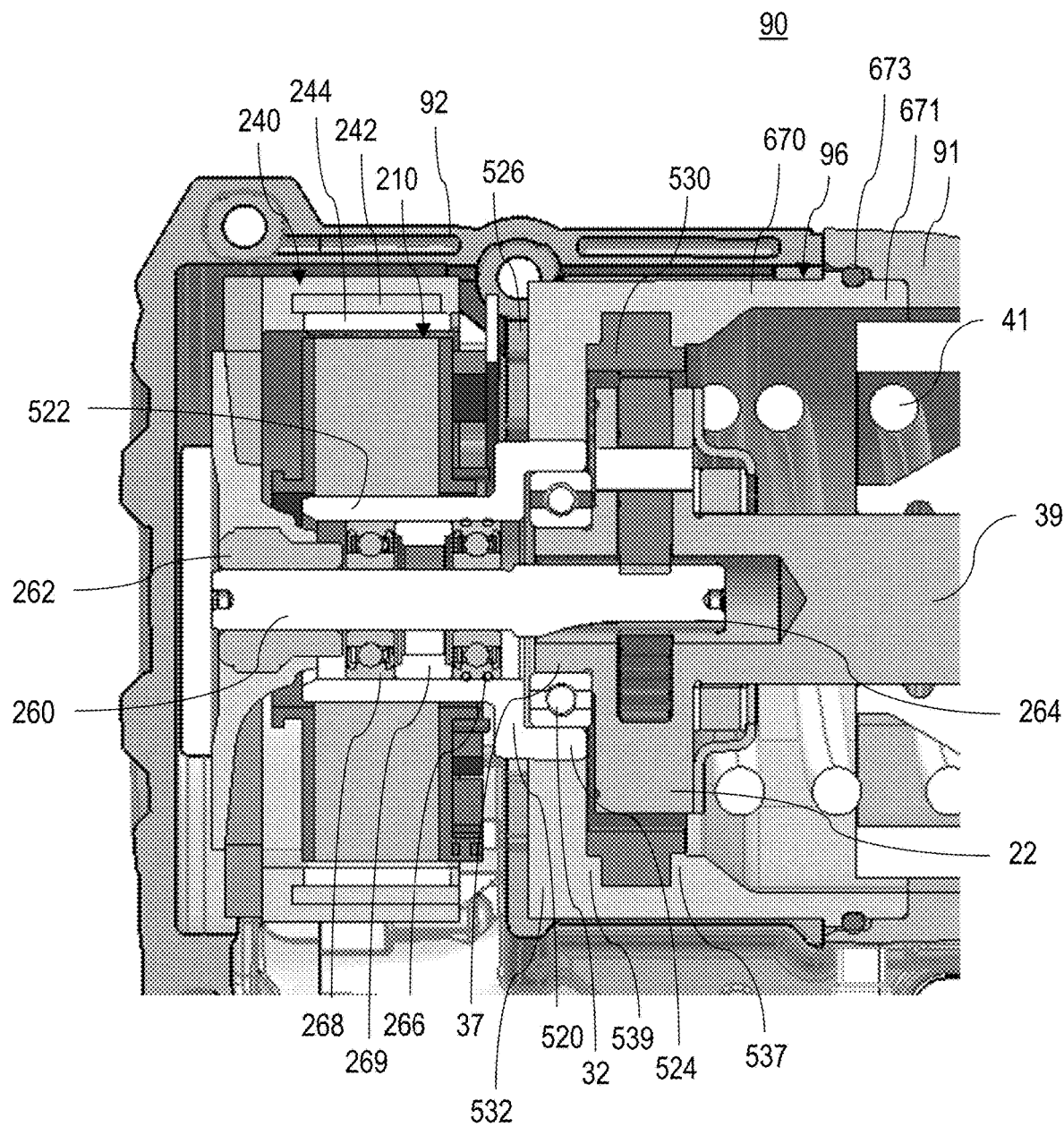
FIG. 25 depicts a partially cross-sectional view of the power tool including the outer-rotor BLDC motor and the transmission assembly, according to an embodiment.

A further and/or alternative embodiment of the invention is described with reference to FIGS. 23-25.

Figure 23:
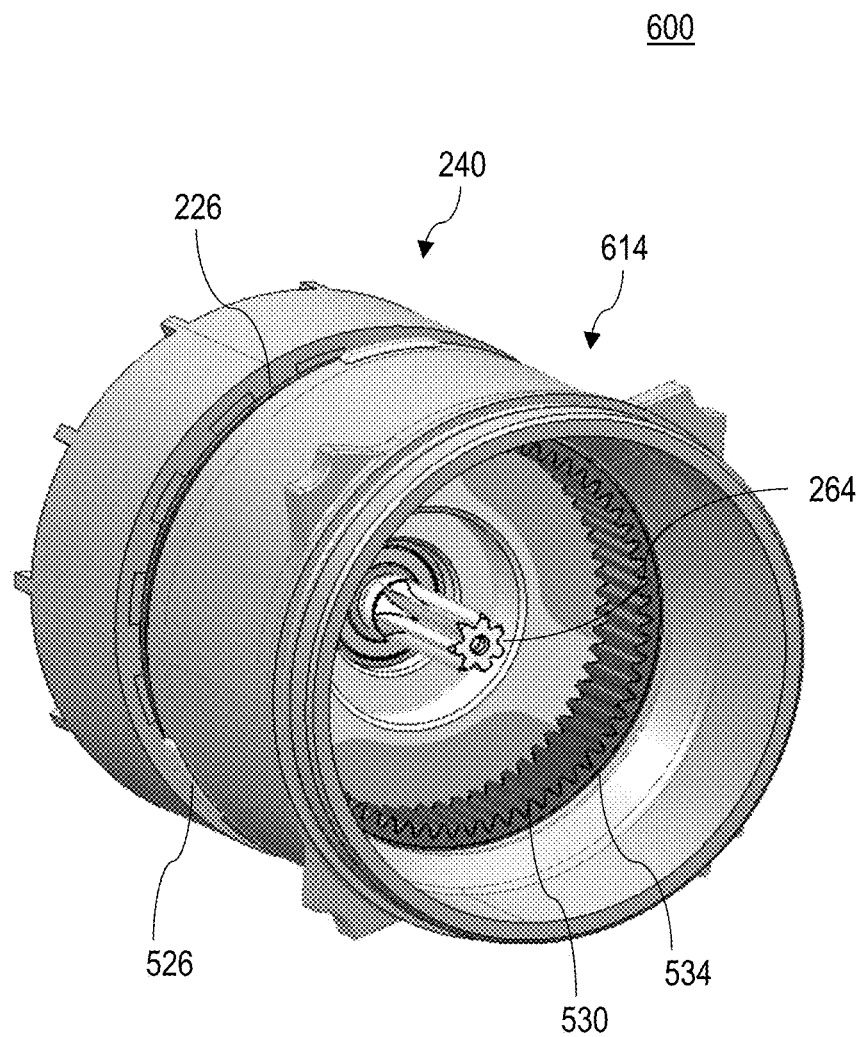
FIG. 23 depicts a perspective view of an outer-rotor BLDC motor, according to a fifth embodiment.

FIG. 23 depicts a perspective view of an outer-rotor BLDC motor 600, according to a fifth embodiment of the invention. FIG. 24 depicts a partially exploded view of the outer-rotor BLDC motor 600, according to an embodiment. FIG. 25 depicts a partially cross-sectional view of the power tool 90 including the outer-rotor BLDC motor 600 and the transmission assembly 96, according to an embodiment.

In an embodiment, power tool 90 includes many of the same features as the above-described power tools, including but not limited to, a power tool housing 92 including two clamshells that come together to house the motor 600, and a nosecone 91 that houses an impact mechanism (not shown). Similarly, motor 600 includes many of the same features as the motor 500 described above. To the extent that these or other power tool components include identical or similar features as described above, the same reference numerals are used.

In this embodiment, like the previous embodiment, motor 600 includes a stator mount assembly 614 that integrally structurally supports the ring gear 530 and the stator mount 516. Like the previous embodiment, the stator mount assembly 614 includes an integrated mounting member 618 that is coupled to the stator mount 516 on one side and includes a radial member 532 formed in contact with the stator mount 516. Also, the stator mount assembly 614 includes a ring gear mount for supporting the ring gear 530. The rotor assembly 240, positional sensor board 226, stator mount 516, and ring gear 530, among other features, remain substantially unchanged.

In this embodiment, however, the portion of the integrated mounting member 618 that forms the ring gear mount is elongated and forms a transmission housing 670 of the transmission assembly 96 that has a substantially cylindrical body and houses various transmission components such as the carrier, the transmission spring 41, and the cam shaft 39. Thus, unlike the previous embodiment, the housing of the transmission assembly 96 is not formed as a part of the nosecone 91. Rather, the transmission housing 670 is integrally incorporated as a part of the stator mount assembly 614. Integration of the transmission housing 670 into the stator mount assembly 614 reduces necessary components and provides a more robust and easier to manufacture design. Details of the integrated mounting member 618 are discussed below.

In an embodiment, the integrated mounting member 618 includes a molded structure formed around the stator mount 516 to radially, rotationally, and axially support the stator mount 516. The integrated mounting member 618 includes many of the retention and support features described above, including the radial member 532 and openings 536, details of which are not repeated here. The molded structure further includes inner rims 537 and 539 that engage axial ends of the ring gear 530 to form the ring gear mount within the transmission housing 670 adjacent the radial member 532. The molded structure is formed in engagement with the outer tabs 540 of the ring gear 530 to rotationally, as well as axially and radially, support the ring gear 530.

In an embodiment, the length of the transmission housing 670 is greater than a length of the motor 240. In an embodiment, a front portion 671 of the transmission housing 670 extends beyond a front end of the tool housing 92 and a front end of the cam carrier 22. The front portion 671 is at least partially received within the nosecone 91. In an embodiment, an O-ring 573 is disposed between the front portion 671 of the transmission housing 670 and the nosecone 91 to substantially seal the transmission assembly 96.

In an embodiment, the front portion 671 includes outer protrusions 676 having rounded outer edges. When fully assembled, the rounded edges of the outer protrusions 676 (similar to outer projections 476 described previously) engage the annular rims formed around threaded openings of the tool housing 92 to rotational lock the transmission assembly 96 relative to the tool housing 92.

The above-described arrangement provides a structure whereby, like the previous embodiments, the stator assembly 210 is fully supported only on one side of the motor 600 by the transmission assembly 96. However, unlike the previous embodiments, where the transmission assembly 96 is provided separately from the motor and as an integral part of the nosecone, in this embodiment, the transmission housing 670 is integrally incorporated into the integrated mounting member 618 and is therefore pre-assembled with the motor 600 prior to the full assembly into the power tool 90. This arrangement provides a highly robust and reliable structure that is easy and efficient to manufacture.

Various aspects and embodiments of the rotor assembly 240 are described herein with reference to FIGS. 26-34.

Figure 26:
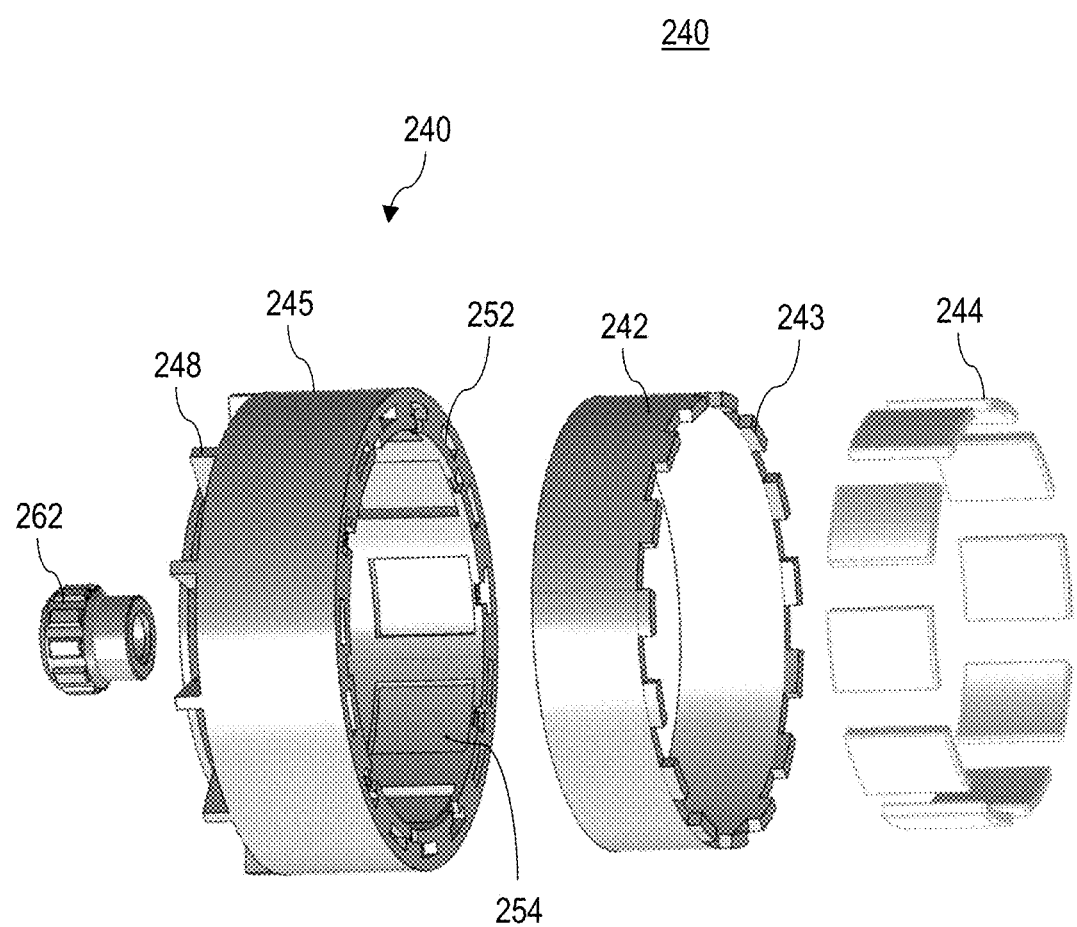
FIG. 26 depicts an exploded perspective view of the rotor assembly, according to an embodiment.
Figure 27:
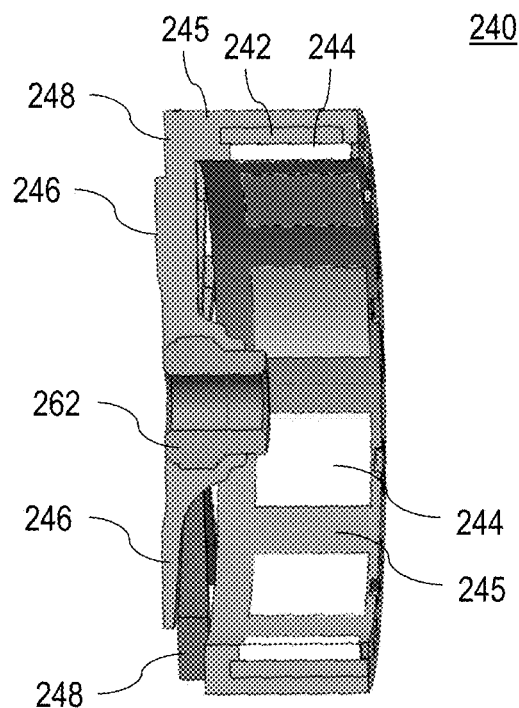
FIG. 27 depicts a side cross-sectional view of the rotor assembly, according to an embodiment.
Figure 28:
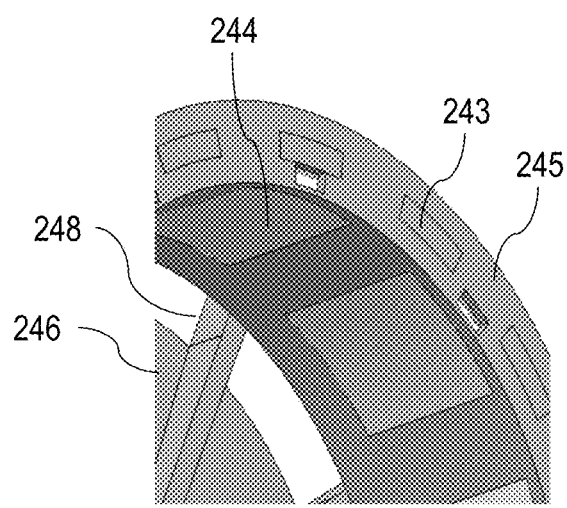
FIG. 28 depicts a partial perspective view of the rotor assembly, according to an embodiment.

FIG. 26 depicts an exploded perspective view of the rotor assembly 240, according to an embodiment. FIG. 27 depicts a side cross-sectional view of the rotor assembly 240, according to an embodiment. FIG. 28 depicts a partial perspective view of the rotor assembly 240, according to an embodiment.

As shown in these figures, permanent magnets 244, of which ten are provided in this example, are secured to the rotor core 242 via the overmold structure 245. In an embodiment, the permanent magnets 244 are mounted to the inner surface of the rotor core 242 and secured via an injection-molding or over-molding process to form the overmold structure 245. In an embodiment, the rotor core 242 includes a series of axially projecting teeth 243. The overmold structure 245 is formed around the teeth 243 along with the rest of the rotor core 242, ensuring that the rotor core 242 is rotationally fixed relative to the overmold structure 245. The teeth 243 also allow the molding machine to secure the rotor core 242 during the molding process. As such, overmold structure 245, when viewed in isolation, includes end slots 252 that contain the teeth 243 of the rotor core 242, and inner magnet grooves 254 that capture the permanent magnets 244. In an embodiment, permanent magnets 244 include chamfers that, when engaged by the overmold structure 245, retain the permanent magnets 244 against the inner surface of the rotor core 242.

Figure 29:
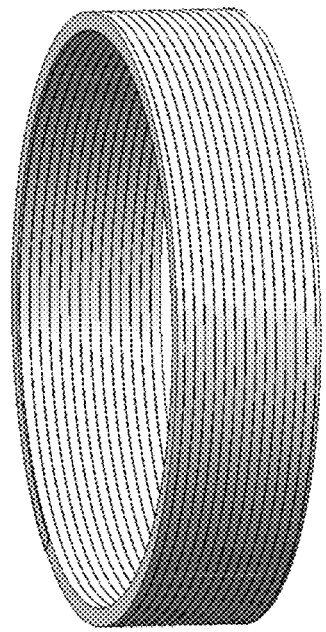
FIG. 29 depict a perspective view of a rotor core, according to an alternative and/or additional embodiment.
Figure 30:
FIG. 30 depicts a coil-shape continuous wire rod used to form the rotor core, according to an embodiment.
Figure 30:
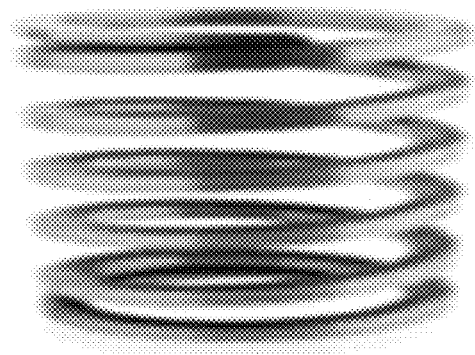
Figure 31:
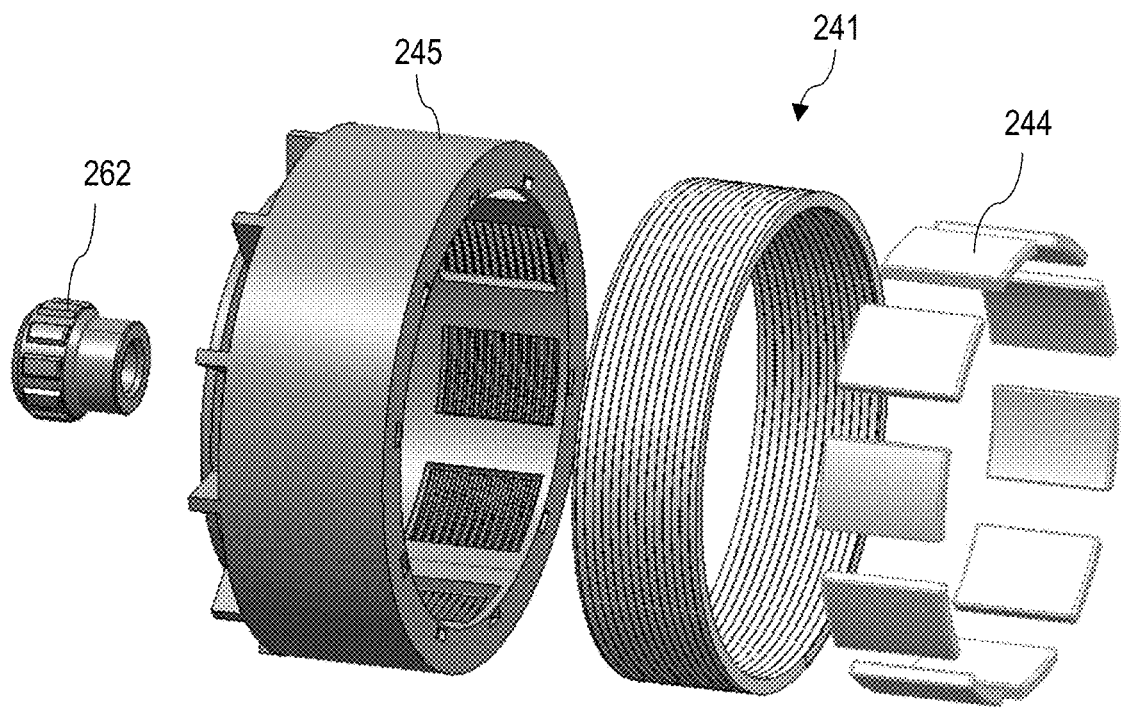
FIG. 31 depicts an exploded view of the rotor assembly utilizing the rotor core, according to an embodiment.

FIG. 29 depict a perspective view of a rotor core 241, according to an alternative and/or additional embodiment of the invention. FIG. 30 depicts a coil-shape continuous wire rod 249 used to form the rotor core 241, according to an embodiment. FIG. 31 depicts an exploded view of the rotor assembly 240 utilizing the rotor core 241, according to an embodiment.

In this embodiment, the rotor core 241, which is the flux ring to which the magnets are mounted, is made of the coil-shaped continuous wire rod 249. The wire rod 249 may be wound around a tubular body to form the coil-shaped pattern, then welded to form a solid flux ring body. Additionally, and/or alternatively, the wire rod 249 may be compressed and held together via the overmold structure 245. The wire rod 249 is less expensive than a seamless tube.

Figure 32:
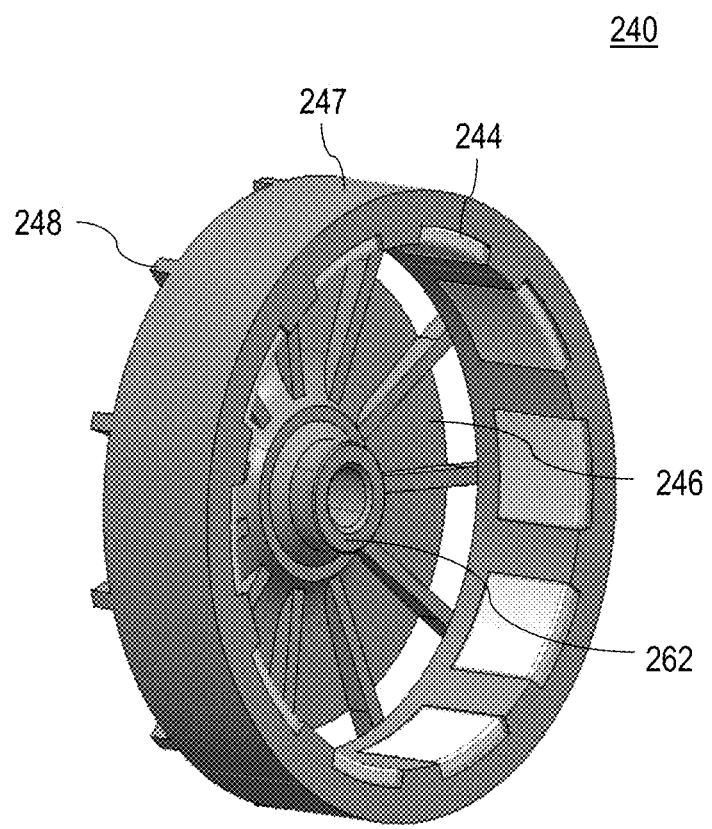
FIG. 32 depicts a perspective view of the rotor assembly, according to a further and/or alternative embodiment.

FIG. 32 depicts a perspective view of the rotor assembly 240, according to a further and/or alternative embodiment. In this embodiment, the rotor core is not formed separately from the overmold structure. Rather, the rotor assembly 240 includes a rotor core 247 formed using a metal injection molding (MIM) process. In this process, finely-powdered metal is mixed with a binding material and molded to the desired shape of the rotor core 247. In an embodiment, the rotor core 247 is formed around the magnets 244 during the MIM process. The molded magnet core 247 increases the magnetic flux of the rotor assembly 240 similarly to a conventional rotor core made of a flux ring, but it is easier and less expensive to manufacture with a high dimensional accuracy.

Figure 33:
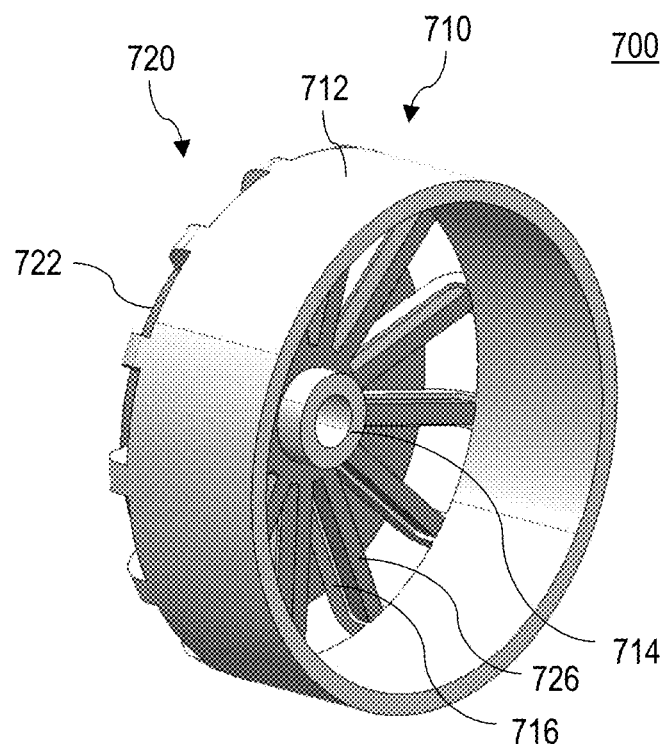
FIG. 33 depicts a perspective view of a rotor core for use in the rotor assembly, according to a further and/or alternative embodiment.
Figure 34:
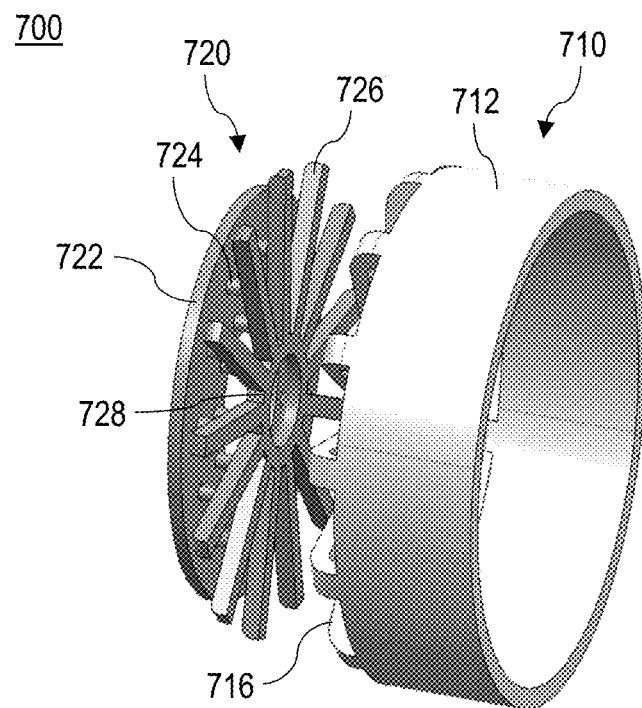
FIG. 34 depicts an explode view of the rotor core, according to an embodiment.

FIG. 33 depicts a perspective view of a rotor core 700 for use in the rotor assembly 240, according to a further and/or alternative embodiment. FIG. 34 depicts an explode view of the rotor core 700, according to an embodiment.

In this embodiment, the rotor core 700 comprises a metal portion 710 and a molded portion 720. The metal portion is made of stamped metal and includes a cylindrical body 712, an inner cylindrical member 714 for securely receiving a rotor shaft (not shown), and a series of first radial arms 716 integrally attached and extending radially between the cylindrical body 712 and the inner cylindrical member 714. The molded portion 720 is formed from resin or epoxy material via an insert-molding or injection-molding process around the metal portion 710. The molded portion 720 includes a radial plate 722 having a first center opening and located along a first radial plane, and a series of second radial arms 726 that are attached to the radial plate 722 via a series of axial pins 724 and are formed along a second radial plane. When the molding process is completed, the radial plate 722 is located in contact with rear surfaces of the first radial arms 716, and the second radial arms 726 are located in contact with front surfaces of the first radial arms 716. In an embodiment, the first radial arms 716 may include a series of through-holes (not shown) through which the axial pins 714 extend between the radial plate 722 and the second radial arms 726. It is noted, however, that the mold structure may wrap around the first radial arms 716 to connect the radial plate 722 to the second radial arms 726. In an embodiment, the second radial arms 726 extend radially from a center ring 728 that is formed around the inner cylindrical member 714. In an embodiment, the second radial arms 726 may be formed in the molding process in any desired fan blade contour designed to cooperate with the first radial arms 716 to optimize airflow generation.

Figure 35:
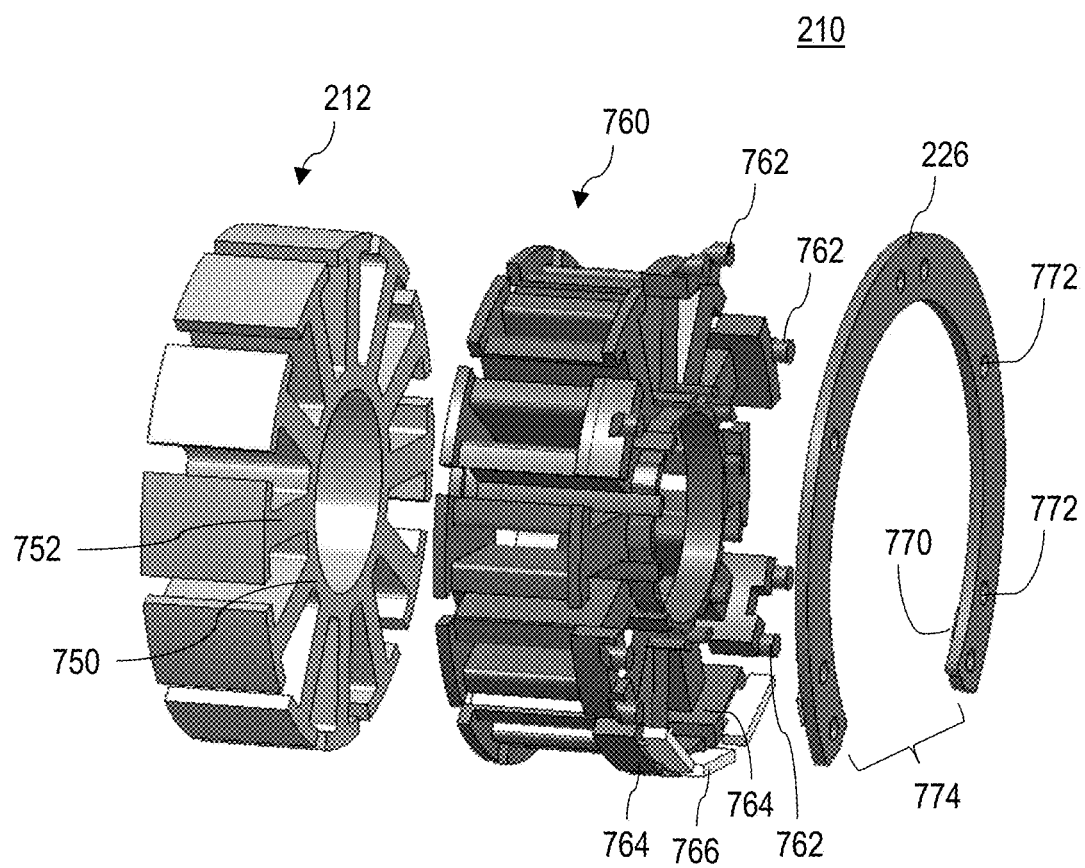
FIG. 35 depicts a perspective exploded view of the stator assembly and the positional sensor board, according to an embodiment.
Figure 36:
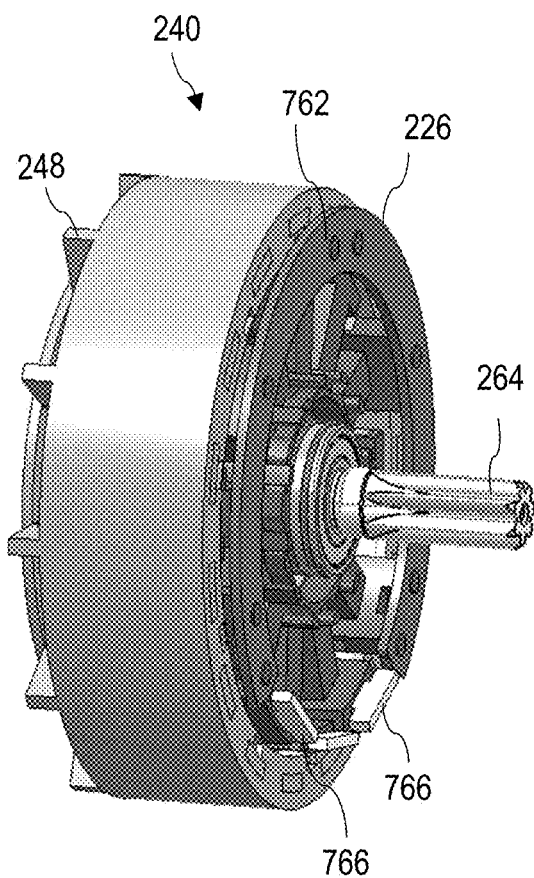
FIG. 36 depicts a partial perspective view of the motor including the positional sensor board, according to an embodiment.

FIG. 35 depicts a perspective exploded view of the stator assembly 210 and the positional sensor board 226, according to an embodiment. FIG. 36 depicts a partial perspective view of the motor 600 including the positional sensor board 226, according to an embodiment. In an embodiment, stator core 212 includes a center annular body 750 and a series of outwardly projecting teeth 752. Stator windings (not shown) are wound around the stator teeth 752. In an embodiment, a molded insulating body 760 formed around the stator core 212 to electrically insulate the stator teeth 752 from the windings. The insulating body 760 substantially covers both end surfaces of the stator core 212 and the inner surfaces of the stator teeth 752. In an embodiment, the insulating body 760 further includes a series of first axial posts 762 that support the positional sensor board 226 at a set distance relative to the stator core 212. In an embodiment, the insulating body 760 further includes a series of second axial posts 764 that support motor terminals 766. In an embodiment, there are three second axial posts 764 are provided to support three motor terminals 766. The three second axial posts 764 are aligned with three adjacent ones of the stator teeth 752.

Figure 37:
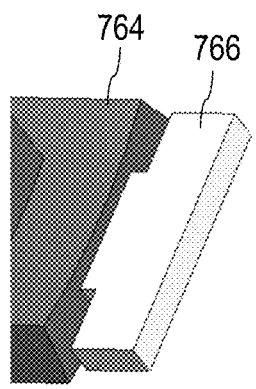
FIG. 37 depicts a zoomed-in view of one of the second axial posts and a corresponding motor terminal, according to an embodiment.

FIG. 37 depicts a zoomed-in view of one of the second axial posts 764 and a corresponding motor terminal 766, according to an embodiment. In an embodiment, each terminal 766 includes a substantially planar body and a rear tab 768. The insulating body 760 is molded to securely capture the rear tab 768 within the second axial post 764.

In an embodiment, referring again to FIGS. 35 and 36, the positional sensor board 226 is substantially C-shaped with an outer diameter that is slightly greater than the outer diameter of the stator core 212 and an inner diameter than is greater than the diameter of the center annular body 750. A series of positional sensors 770 are mounted on the positional sensor board 226 to sense a magnetic flux of the rotor. The positional sensor board 226 includes a series of openings 772 that receive the first axial posts 762 to secure the positional sensor board 226 to the insulating body 760. Further, the ends of the positional sensor board 226 define a gap 774 that is aligned with the motor terminals 762. In an embodiment, the gap 774 extends an angular distance of approximately 40 to 50 degrees. This structure allows motor terminals 766 to be received within the gap 774 and therefore be orientated radially in-line with the positional sensor board 226.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power tool comprising:

a tool housing;

a brushless direct-current (BLDC) motor disposed in the tool housing and including a stator including a stator core having an aperture extending therethrough and a plurality of stator windings, a rotor comprising a cylindrical rotor core supporting at least one permanent magnet around an outer surface of the stator core, and a rotor shaft rotatably coupled to the rotor;

a stator mount assembly comprising a stator mount including an axial member secured to the stator, at least one radial arm, and an integrated mounting member including a radial member secured to the stator mount, a ring gear mount extending from the radial member away from the motor, and a ring gear supported by the ring gear mount, wherein the radial member of the integrated mounting member is molded around the at least one radial arm to secure the integrated mounting member to the stator mount; and a transmission secured to the tool housing, the transmission including a transmission housing having a generally cylindrical body, and a planetary gear set including a carrier and at least one planet gear rotatably mounted to the carrier, wherein the ring gear meshes with the at least one planet gear.

2. The power tool of claim 1, wherein the rotor comprises a rear wall proximate a rear end of the stator that is mounted on the rotor shaft, the rotor shaft extending through the aperture of the stator to be coupled to an input member of the transmission.

3. The power tool of claim 2, wherein the axial member of the stator mount comprises a cylindrical portion onto which the stator core is securely mounted, wherein the rotor shaft extends through the cylindrical portion, further comprising at least one motor bearing having an inner race mounted on the rotor shaft and an outer race secured within the cylindrical portion.

4. The power tool of claim 1, wherein the stator mount includes at least one protrusion that is received into a peripheral opening of the integrated mounting member to secure the integrated mounting member at least rotationally to the stator mount.

5. The power tool of claim 1, further comprising a carrier bearing configured to support the carrier relative to the stator mount assembly, wherein the stator mount includes a frontal annular body forming a bearing holder for the carrier bearing to radially align the carrier bearing with the radial member of the integrated mounting member.

6. The power tool of claim 1, wherein the ring gear mount is discretely coupled to the transmission housing and the transmission housing overlaps at least the ring gear mount of the integrated mounting member.

7. The power tool of claim 6, further comprising an O-ring disposed between the integrated mounting member and the transmission housing to substantially seal the transmission.

8. The power tool of claim 6, further comprising a nosecone mounted on the tool housing to provide an output member configured to be rotatably driven by a cam shaft coupled to the carrier, wherein the transmission housing is integrally formed with the nosecone and extends rearwardly therefrom inside the tool housing.

9. The power tool of claim 1, wherein a distance between a front end of the motor and a rear end of the transmission is at most 7.7 mm, and wherein the motor has an outer diameter than is smaller than or equal to approximately 52 mm and produces a maximum power output of at least 620 watts from a 20V max power tool battery pack.

10. A power tool comprising:
a tool housing;
a brushless direct-current (BLDC) motor disposed in the tool housing and including a stator including a stator core having an aperture extending therethrough and a plurality of stator windings, a rotor comprising a cylindrical rotor core supporting at least one permanent magnet around an outer surface of the stator core, and a rotor shaft rotatably coupled to the rotor;
a stator mount assembly comprising a stator mount including an axial member secured to the stator, and an integrated mounting member including a radial member secured to the stator mount and a transmission housing having a generally cylindrical body integrally extending from the radial member away from the motor, wherein the transmission housing is secured to the tool housing and houses components of a transmission, wherein the components of the transmission include a carrier, at least one planet gear rotatably mounted to the carrier, and a ring gear supported by the transmission housing and meshed with the at least one planet gear.

11. The power tool of claim 10, wherein the rotor comprises a rear wall proximate a rear end of the stator that is mounted on the rotor shaft, the rotor shaft extending through the aperture of the stator to be coupled to an input member of the transmission.

12. The power tool of claim 11, wherein the axial member of the stator mount comprises a cylindrical portion onto which the stator core is securely mounted, wherein the rotor shaft extends through the cylindrical portion, further comprising at least one motor bearing having an inner race mounted on the rotor shaft and an outer race secured within the cylindrical portion.

13. The power tool of claim 10, wherein the stator mount includes at least one radial arm, and wherein the radial member of the integrated mounting member is molded around the at least one radial arm to secure the integrated mounting member to the stator mount.

14. The power tool of claim 13, wherein the stator mount includes at least one protrusion that is received into a peripheral opening of the integrated mounting member to secure the integrated mounting member at least rotationally to the stator mount.

15. The power tool of claim 10, further comprising a carrier bearing configured to support the carrier relative to the stator mount assembly, wherein the stator mount includes a frontal annular body forming a bearing holder for the carrier bearing to radially align the carrier bearing with the radial member of the integrated mounting member.

16. The power tool of claim 10, further comprising a nosecone mounted on the tool housing to provide an output member, wherein a front portion of the transmission housing extends out of the tool housing and is received within the nosecone.

17. The power tool of claim 16, further comprising an O-ring disposed between the front portion of the transmission housing and the nosecone to substantially seal the transmission assembly.

18. The power tool of claim 10, wherein the transmission housing includes at least one inner rim that engages an axial end of the ring gear to secure the ring gear within the transmission housing, and a plurality of outer protrusions on the outer surface of the transmission housing configured to engage a portion of the tool housing to rotationally fix the transmission.

19. The power tool of claim 10, wherein a distance between a front end of the motor and a rear end of the transmission is at most 7.7 mm, and wherein the motor has an outer diameter than is smaller than or equal to approximately 52 mm and produces a maximum power output of at least 620 watts from a 20V max power tool battery pack.

* * * * *